United States Patent
Hendrickson et al.

(10) Patent No.: US 11,189,196 B2
(45) Date of Patent: Nov. 30, 2021

(54) SYSTEMS AND METHODS FOR PALPATION TRAINING

(71) Applicant: Colorado State University Research Foundation, Fort Collins, CO (US)

(72) Inventors: Dean A. Hendrickson, Fort Collins, CO (US); Grahm J. Hendrickson, Fort Collins, CO (US); Jessica L. Sullivan, Fort Collins, CO (US); Anura P. Jayasumana, Fort Collins, CO (US); Bradley S. Evans, Fort Collins, CO (US); Yiyu Feng, Boise, ID (US)

(73) Assignee: Colorado State University Research Foundation, Fort Collins, CO (US)

( * ) Notice: Subject to any disclaimer, the term of this patent is extended or adjusted under 35 U.S.C. 154(b) by 670 days.

(21) Appl. No.: 15/305,758

(22) PCT Filed: Apr. 24, 2015

(86) PCT No.: PCT/US2015/027502
§ 371 (c)(1),
(2) Date: Oct. 21, 2016

(87) PCT Pub. No.: WO2015/164732
PCT Pub. Date: Oct. 29, 2015

(65) Prior Publication Data
US 2017/0046985 A1    Feb. 16, 2017

Related U.S. Application Data

(60) Provisional application No. 61/983,768, filed on Apr. 24, 2014.

(51) Int. Cl.
*G09B 23/32*    (2006.01)
*G09B 23/34*    (2006.01)
(Continued)

(52) U.S. Cl.
CPC ............ *G09B 23/32* (2013.01); *G09B 23/28* (2013.01); *G09B 23/30* (2013.01); *G09B 23/34* (2013.01)

(58) Field of Classification Search
CPC ........ G09B 23/32; G09B 23/28; G09B 23/30; G09B 23/34
(Continued)

(56) References Cited

U.S. PATENT DOCUMENTS 3,877,843 A * 4/1975 Fischel ................... F04B 49/06
                                                        417/394
5,055,051 A * 10/1991 Duncan .................. G09B 23/28
                                                        434/262
(Continued)

OTHER PUBLICATIONS

International Search Report and Written Opinion, PCT/US2015/027502, dated Jul. 21, 2015.

*Primary Examiner* — Thomas J Hong
*Assistant Examiner* — Sadaruz Zaman
(74) *Attorney, Agent, or Firm* — Polsinelli PC

(57) ABSTRACT

Implementations described and claimed herein provide systems and methods for palpation training. In one implementation, a system for medical procedure simulation includes an examination model, a sensor network, and a computing device. The examination model has a plurality of anatomical structure models, and the sensor network has a plurality of sensors. Each of the sensors is associated with one of the plurality of anatomical structure models and configured to capture examination data. The computing device is in communication with the sensor network and configured to generate feedback for an accuracy of a medical examination using the examination data.

18 Claims, 19 Drawing Sheets

(51) Int. Cl.
  *G09B 23/28* (2006.01)
  *G09B 23/30* (2006.01)
(58) Field of Classification Search
  USPC .......................................................... 434/272
  See application file for complete search history.

(56) References Cited

U.S. PATENT DOCUMENTS

| | | | | |
|---|---|---|---|---|
| 5,957,694 A * | 9/1999 | Bunch | ................... | G09B 23/36 |
| | | | | 434/262 |
| 6,038,488 A * | 3/2000 | Barnes | ................... | G09B 23/28 |
| | | | | 128/920 |
| 8,342,853 B2 * | 1/2013 | Cohen | ................... | G09B 23/32 |
| | | | | 434/267 |
| 8,827,720 B1 * | 9/2014 | Lazarus | ................. | G09B 23/34 |
| | | | | 434/262 |
| 10,885,813 B2 * | 1/2021 | Krummenacher | ..... | G09B 23/30 |
| 2002/0007668 A1 * | 1/2002 | Maruta | ................. | G01M 15/09 |
| | | | | 73/114.63 |
| 2002/0076681 A1 | 6/2002 | Leight et al. | | |
| 2003/0031993 A1 * | 2/2003 | Pugh | ...................... | G09B 23/30 |
| | | | | 434/262 |
| 2004/0126746 A1 * | 7/2004 | Toly | ....................... | G09B 23/28 |
| | | | | 434/262 |
| 2004/0234933 A1 * | 11/2004 | Dawson | ................. | G09B 23/28 |
| | | | | 434/262 |
| 2007/0003917 A1 * | 1/2007 | Kitching | ................ | G09B 23/32 |
| | | | | 434/272 |
| 2008/0138778 A1 * | 6/2008 | Eggert | ................... | G16H 50/50 |
| | | | | 434/262 |
| 2009/0002089 A1 * | 1/2009 | Karr | .................... | H04L 27/0008 |
| | | | | 332/117 |
| 2009/0148822 A1 * | 6/2009 | Eggert | ................... | G16H 50/50 |
| | | | | 434/271 |
| 2009/0208915 A1 | 8/2009 | Pugh | | |
| 2010/0291522 A1 * | 11/2010 | Cook | .................... | G09B 23/28 |
| | | | | 434/265 |
| 2011/0217684 A1 * | 9/2011 | Park | ..................... | G09B 23/285 |
| | | | | 434/268 |
| 2012/0288837 A1 * | 11/2012 | Eikefjord | ............... | G09B 23/30 |
| | | | | 434/262 |
| 2014/0272870 A1 * | 9/2014 | Eichhorn | ............... | G09B 23/30 |
| | | | | 434/267 |
| 2014/0322682 A1 * | 10/2014 | Baym | ..................... | G09B 7/02 |
| | | | | 434/219 |
| 2014/0322688 A1 * | 10/2014 | Park | ..................... | G09B 23/303 |
| | | | | 434/268 |
| 2016/0314718 A1 * | 10/2016 | Bergs | ..................... | G09B 23/32 |
| 2019/0283247 A1 * | 9/2019 | Chang | ................. | A61H 1/0244 |

\* cited by examiner

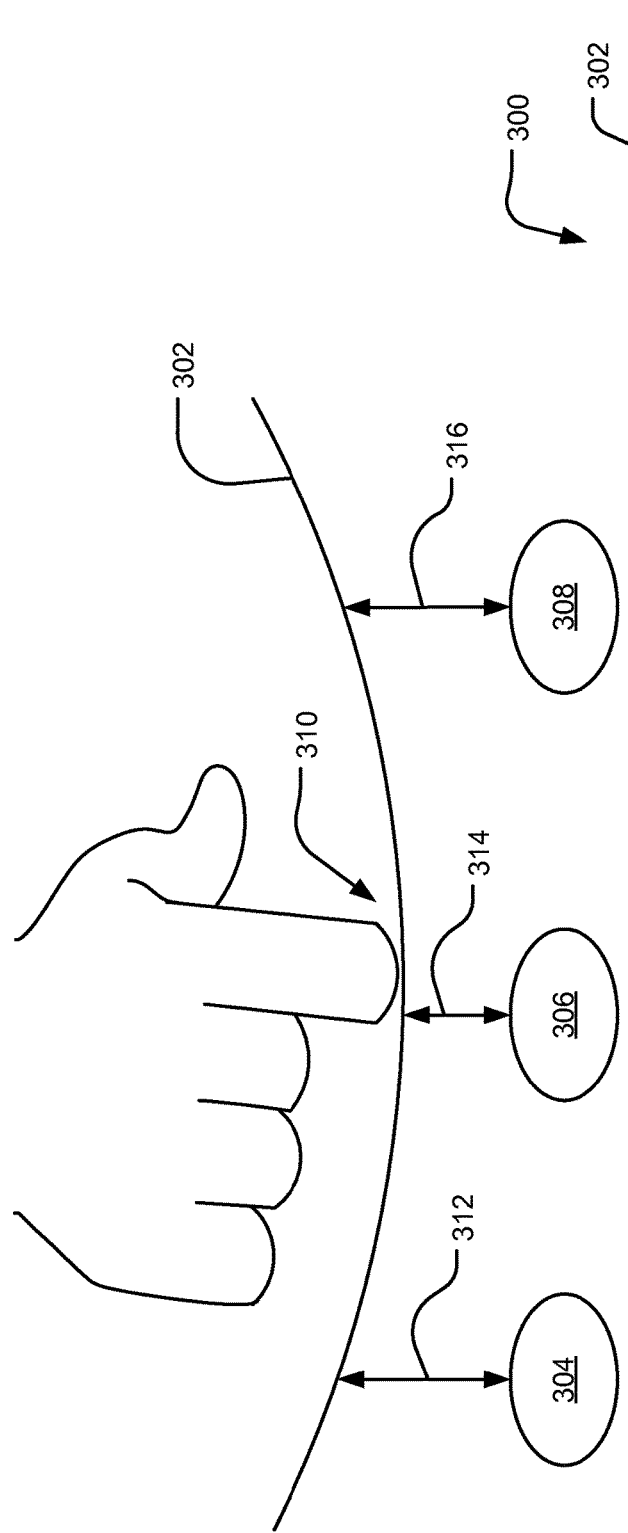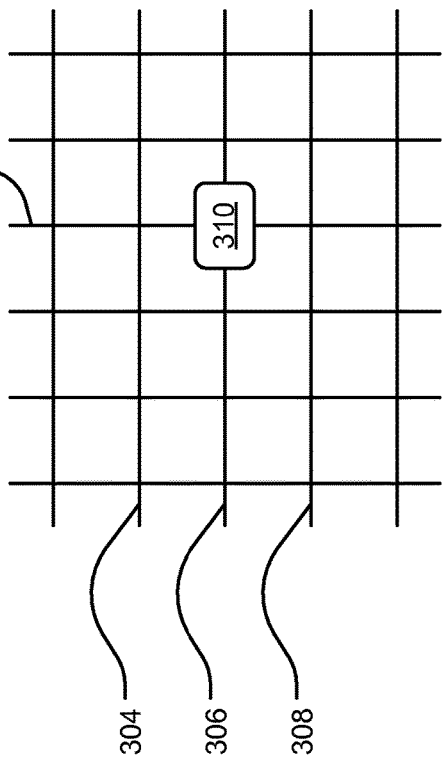

SYSTEMS AND METHODS FOR PALPATION TRAINING

CROSS-REFERENCE TO RELATED APPLICATION

The present Patent Cooperation Treaty application claims priority under 35 U.S.C. § 119 to U.S. Provisional Patent Application No. 61/983,768, entitled "High Fidelity Physical Examination Model" and filed on Apr. 24, 2014. The aforementioned application is hereby incorporated by reference in its entirety into the present Patent Cooperation Treaty application.

TECHNICAL FIELD

Aspects of the present disclosure relate to simulated anatomical models and more particularly to systems and methods of physical examination training using such models.

BACKGROUND

Palpation is a vital medical technique providing a rapid health assessment of the major organs of patients, such as canines, felines, humans, or other animals. Palpation generally involves a healthcare professional applying her fingers or hands to a surface of the patient's body to physically examine a condition of an underlying organ. Such a physical examination provides information regarding the health of a patient that visual inspection alone cannot. For example, palpation indicates skin temperature, skin moisture, organ health, internal swelling, deformations, tumors, and/or the like.

Medical techniques are most effectively learned heuristically through physical practice on live patients or in a simulated environment. Using a live patient for training, however, frequently induces discomfort in the patient, particularly where the technique is practiced by a large number of students consecutively. For example, canine palpation techniques may be learned using a live canine, and over the course of multiple students practicing the technique, the canine often becomes agitated and/or sore.

Conventional palpation models replicate the internal organ structure of a live patient, while permitting the practice of palpation techniques an unlimited number of times by students. However, such models fail to decipher between an accurate and an inaccurate or otherwise imprecise performance of palpation techniques. Many students are unconfident in their palpation skills and often resort to memorizing a script of what to say and generally where to feel on a model to pass an examination. Moreover, accurate palpation is performed with an application of force necessary to assess the health of internal organs without inducing discomfort in a patient. Conventional models fail to measure or otherwise provide an indication of the level of force applied by a student during palpation. An instructor thus cannot positively establish whether a student successfully learned palpation or know for sure what the student is actually feeling during a palpation.

It is with these observations in mind, among others, that various aspects of the present disclosure were conceived and developed.

SUMMARY

Implementations described and claimed herein address the foregoing problems by providing systems and methods for medical technique training. In one implementation, a system for medical procedure simulation includes an examination model, a sensor network, and a computing device. The examination model has a plurality of anatomical structure models, and the sensor network has a plurality of sensors. Each of the sensors is associated with one of the plurality of anatomical structure models and configured to capture examination data. The computing device is in communication with the sensor network and configured to generate feedback for an accuracy of a medical examination using the examination data.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIGS. 3A and B illustrate an example system for determining a palpation location.

DETAILED DESCRIPTION

Aspects of the present disclosure generally involve systems and methods for palpation training and testing using at least one physical examination model. In one aspect, a high-fidelity physical examination model is configured to simulate a variety of organ conditions, including abnormalities, for palpation. The examination model includes one or more sensors in communication with a user device to provide real-time feedback regarding a caliber of the palpation. Data captured by the one or more sensors may further be utilized to generate examination analytics to identify student, class, and/or instructor trends, among other areas of improvement or analytics. The examination model further includes one or more actuators in communication with the user device to configure organs and other anatomical structures to simulate different conditions.

The various systems and methods disclosed herein generally provide for patient simulation to facilitate medical technique training through an interactive heuristic approach. The example implementations discussed herein reference palpation training. However, it will be appreciated by those skilled in the art that the presently disclosed technology is applicable to other medical techniques, including but not limited to, other physical examination techniques, surgical techniques, prenatal medical techniques, emergency medical techniques, cardiopulmonary resuscitation (CPR) techniques, and the like.

Figure 1:
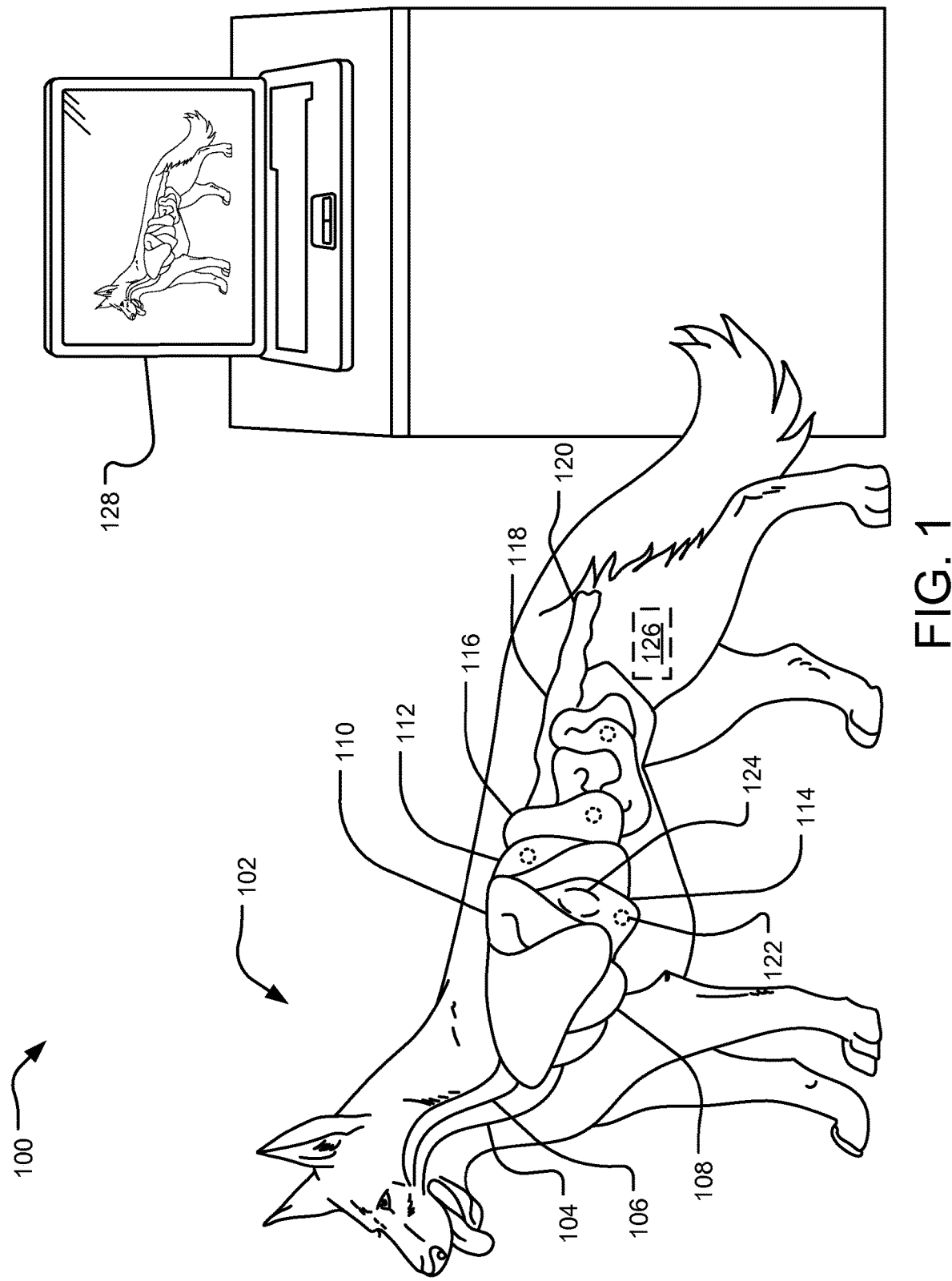
FIG. 1 illustrates an example examination system configured to simulate patient palpation in a training environment.

To begin a detailed discussion of systems and methods for palpation training, reference is made to FIG. 1, which shows an example examination system 100 configured to simulate patient palpation. In one implementation, the examination system 100 includes an examination model 102, which replicates the anatomy of a patient to simulate palpation procedures. The patient simulated may be a variety of animals, including, without limitation, human, canine, feline, equine, bovine, mammalian, or non-mammalian.

Depending on the species of the patient simulated, the examination model 102 includes one or more anatomical structures, including, without limitation, intra-abdominal organs, endoskeleton, skin, soft tissues, and/or the like to form a multilayer realistic imitation of the patient. For example, as shown in FIG. 1, the examination model 102 of a canine may include an esophagus 104, a trachea 106, a heart 108, lungs 110, a stomach 112, a liver 114, a spleen 116, intestines 118, a rectum 120, pancreas, kidneys, bladder, skeleton, and soft tissues. The anatomical structures may be made from a variety of materials having different textures, consistencies, colors, and other characteristics to replicate the corresponding characteristics of living specimens. In one implementation, the examination model 102 includes a plastic endoskeleton covered with silicone rubber and an abdominal body wall having different combinations of platinum cured room temperature vulcanization (RTV) silicone rubbers. The various inter-abdominal organs (e.g., organs 104-120) are made of silicone rubber with similar texture, density, and other characteristics of the living specimens, and soft tissues replicated in the examination model 102 are similarly made from silicone with realistic characteristics.

In one implementation, the examination model 102 facilitates an accurate identification of one or more anatomical structures, assessment of a medical condition of an anatomical structure, and a proper application of force during palpation exercises, including training and testing. The examination model 102 provides haptic feedback via one or more sensors 122 to validate a proficiency of a palpation procedure. In one implementation, intra-abdominal organs, such as the stomach 112, the liver 114, the spleen 116, the intestines 118, the kidneys, and the bladder, each have one or more sensors 112 embedded therein or otherwise associated therewith to capture examination data, including location and pressure values.

The sensors 122 may include, without limitation, force sensors, pressure sensors, mechanical sensors, electrical sensors, optical sensors, tactile sensors, ultrasound sensors, red-green-blue (RGB) sensors, Near Infrared (NIR) sensors, stereoscopic sensors, and the like to capture or supplement examination data. In one implementation, the sensors 122 are configured for capacitive sensing using a grid of wires. Application of pressure during palpation decreases the proximity between triggered wires and increases the capacitance, thereby providing location and pressure values of the palpation. In another implementation, the sensors 122 utilize force sensitive resistors to detect location and pressure values, among other examination data. When force is applied to synthetic skin of the examination model 102 during palpation, the force transfers through the synthetic skin and other layers of synthetic tissue to the sensors 122 where location and pressure values are ascertained based on which of the sensors 122 are triggered. Stated differently, the resistance of the sensors 122 will vary depending on whether the sensor 122 is triggered and on the corresponding pressure applied.

In addition to identification and proper application of pressure, accurate assessment of the heath of an organ or other anatomical structure is vital to proficient palpation. Thus, in one implementation, the examination model 102 includes one or more actuators 124 configured to modify characteristics of the anatomical structures to simulate different conditions. For example, each of the intra-abdominal organs, such as the stomach 112, the liver 114, the spleen 116, the intestines 118, the kidneys, and the bladder, may include one or more of the actuators 124 to modify the organ volume, density, texture, and/or the other characteristics to simulate a normal condition or various abnormal conditions, including diseases, ailments, or other abnormalities.

As an example, a student simulates a canine palpation by feeling upward on the synthetic belly of the examination model 102 using three fingers from each of her hands. Each of the six major organs, including the liver 114, the spleen 116, the kidneys, the stomach 112, the bladder, and the intestines 118, are consecutively examined to assess the organ health. As each of the organs is examined, feedback on a quality of the palpation and an accuracy of the assessment of the health of the organ is provided.

In one implementation, a controller 126 is configured to control various operations of the examination model 102, including the capture of examination data by the sensors 122 and the actuation of the anatomical structures among the various condition states using the actuators 124. The controller 126 is in wired and/or wireless communication with a user device 128 to provide haptic feedback of a palpation;

execute palpation exercises, such training or testing sessions; calibrate the examination model 102; generate examination analytics; and/or the like. In one implementation, the controller 126 preprocesses the examination data captured by the sensors 122 prior to sending to the user device 128. In one implementation, the examination system 100 provides real time feedback identifying the location and pressure applied during palpation.

The feedback may be provided via the user device 128 and/or in controller 126 in various formats, including, without limitation, audio, visual, and/or tactile. For example, if the pressure applied during a simulated palpation is too high or in the wrong location, the controller 126 and/or the user device 128 may generate: an audio alert, such as a bark; a visual alert, such as a blinking or colored light; a tactile alert, such as a vibration. The intensity of such alerts may vary depending on the accuracy or inaccuracy of the palpation, as well as the nature of any inaccuracy. For example, different types or intensities of alerts may be employed to distinguish among a range of pressures applied (e.g., too light, too hard, and proper pressure), an accuracy of location, and the like. The feedback may further include an indication of what adjustments need to be made to reach the proper location and/or pressure. In one implementation, the feedback, including the alerts, are providing via a user interface displayed in a window of the user device 128, as described herein.

In one implementation, as the palpation is performed for each organ, the user inputs an assessment of the health of the organ, including information regarding a condition state (e.g., normal, abnormal, etc.) using one or more input devices (e.g., microphone, keyboard, touch screen, mouse, camera, etc.) in communication with the controller 126 and/or the user device 128. The input may include, without limitation, text, images, audio, multimedia, and/or other content formats. The controller 126 and/or the user device 128 may generate alerts or other feedback regarding an accuracy of the health assessment. The examination system 100 thus provides a user, such as an instructor or student, to assess a progression of palpation proficiency.

Calibrating the examination model 102 for palpation involves quantifying a range of proper pressure values for palpation. In one implementation, the range of pressure values is quantified using force values for a palpation type and an area of the examining surface. For example, canine palpation involves an examining surface corresponding to three fingers from each hand. The pressure is equal to the palpation force divided by the examining surface area. In one particular implementation, a range of pressure for canine palpation ranges from approximately 2690.55 N/m² to 7046.67 N/m².

Figure 2:
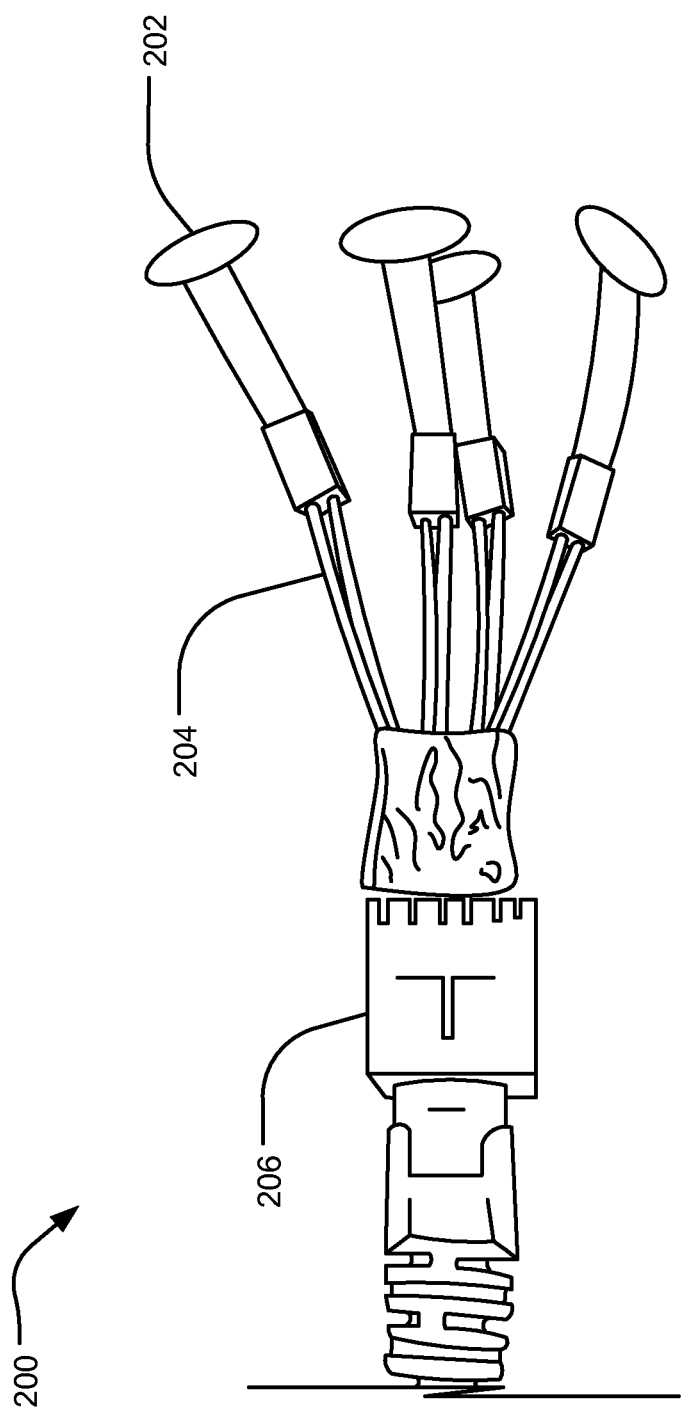
FIG. 2 shows an example sensor network for an examination model.

Turning to FIG. 2, an example sensor network 200 for an examination model is shown. In one implementation, the sensor network 200 includes one or more sensor heads 202 connected to a controller cable 206 via sensor cables 204. The controller cable 206 may be any form of communication cable configured to connect with a computing device, such as the controller 126 or the user device 128. For example, the controller cable 206 may be an Ethernet cable, Universal Serial Bus (USB) cable, or the like. The sensor cables 204 may be any similar communication cable configured to interface with the controller cable 206. For example, the sensor cables 204 may be a Registered Jack (RJ) connectors or other standardized communication interfaces. In another implementation, the sensor heads 202 include a wireless link to communicate with one or more computing devices wirelessly.

In one implementation, the sensor heads 202 include one or more of the sensors 122. The sensor heads 202 may each be associated with an organ or other anatomical structure. In one particular implementation, the sensor network 200 measures pressure variation on the organs in a voltage divider circuit, and the measured pressure is provided as an analog input voltage for conversion into digital 8-bit numbers for display on a display screen (e.g., a Liquid-Crystal Display (LCD) screen, monitor, or display associated with a user device).

Referring to FIGS. 3A-3B, an example system 300 for determining a palpation location is shown. In one implementation, the system 300 utilizes capacitive sensing based on capacitive coupling. Stated differently, the system 300 detects changes in conductive or dielectric properties resulting from pressure, force, and/or movement. For example, the system 300 may sense a palpation location and pressure using human body capacitance as input.

In one implementation, the system 300 includes a series of wires, including wires 302-308 arranged in a pattern. For example, as shown in FIG. 3B, the wires may be arranged in grid pattern of x-y coordinates. Prior to the application of pressure during palpation, the wires extending in the x-direction (e.g., the wire 302) are spaced a resting distance from the wires extending in the y-direction (e.g., the wires 304-308). For example, the resting distance of the wires 304 and 308 as shown in FIGS. 3A-3B may be the distances 312 and 316. In one implementation, the system 300 continuously measures the capacitance of the wires. By measuring a capacitance change of one or more of the wires, a palpation location 310 and the applied pressure is determined.

The application of pressure triggers a first wire 302 and a second wire 306. By triggering a plurality of wires (e.g., the wires 302 and 306) simultaneously, the palpation location 310 is determined. Upon the application of pressure at the palpation location 310, a distance 314 between the first wire 302 and the second wire 306 decreases, thereby causing the capacitance to increase. In other words, $C=\varepsilon_r\varepsilon_0(A/d)$ where C is the capacitance, $\varepsilon_r$ is the relative static permittivity, $\varepsilon_0$ is the electric constant, A is the area, and d is the distance. The change in capacitance provides a pressure at the palpation location 310.

Figure 4:
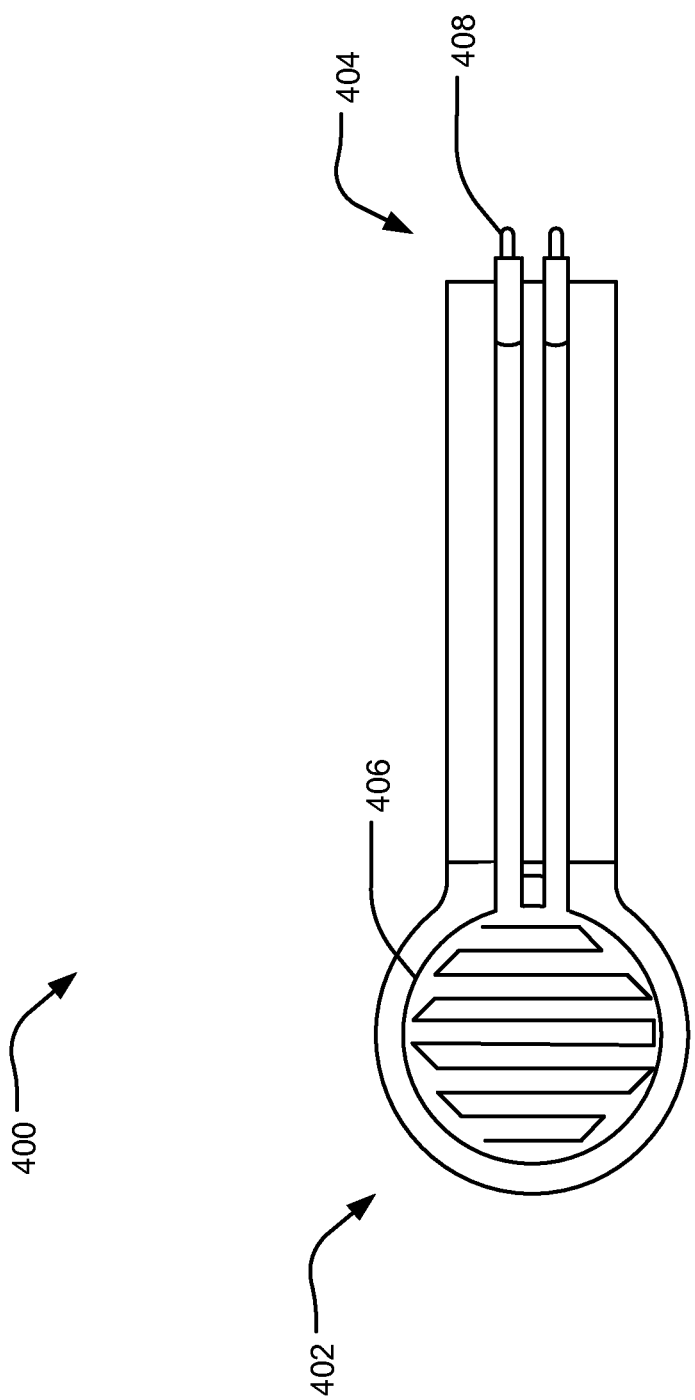
FIG. 4 shows an example sensor employing a force-sensitive resistor.

Turning to FIG. 4, a detailed description of an example sensor 400 employing a force-sensitive resistor is provided. In one implementation, the sensor 400 includes a sensor head 402 having a sensor face 406 in electronic communication with one or more connectors 408 at a sensor tail 404.

The sensor 400 may be embedded in or otherwise associated with an organ or other anatomical structure. To determine a palpation location and pressure, a resistance of the sensor face 406 is measured. The measured resistance varies depending on the pressure applied. In one implementation, an examination model employs a plurality of the sensors 400 in a simulated abdominal cavity. For example, a canine examination model may include eight of the sensors 400 positioned in organs and open areas of the bottom of the simulated abdominal cavity. When force is applied to the examination model, the force transfers through simulated skin, organs, and tissues of the examination model to the sensors 400. Based on which of the sensors 400 are triggered, location and pressure values may be determined.

In one implementation, the resistance of the sensor 400 decreases as the force applied during palpation increases. Stated differently, the relationship between force and resistance provides pressure information through a measurement of the resistance of the sensor 400. A voltage divider circuit may be employed with the sensor 400 and an analog digital (A/D) converter to provide active feedback during palpation. Alternatively, the sensor 400 may include a barometric sensor connected to an inter-integrated circuit (I2C) channel or a universal asynchronous receive transmit (UART) channel.

Figure 5:
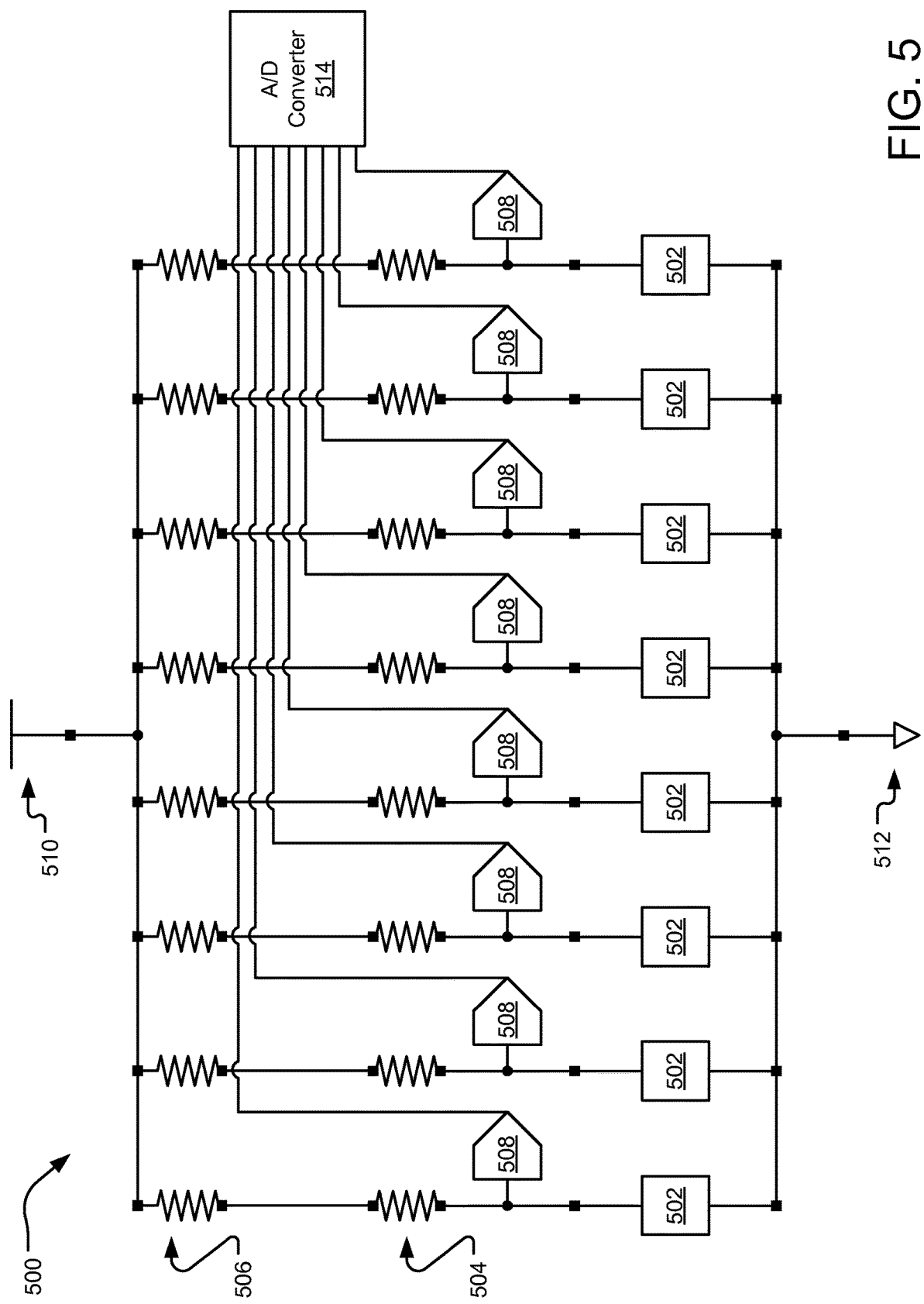
FIG. 5 is a circuit diagram of an example sensor network for an examination model.

As can be understood from FIG. 5, in one implementation, an example sensor network 500 for an examination model includes a plurality of sensors 502, which may be a variety of different sensors, as described herein. In one implementation, the sensors 502 are the force-sensitive resistors described with respect to FIG. 4.

In one implementation, the sensors 502 are connected in series to fixed resistors 504 and breadboard resistors 506, with of the sensors 502 forming a voltage divider branch. The variation of pressure during palpation changes the voltage between the fixed resistor 504 and the sensor 502. Stated differently, in one implementation, each of the sensors 502 is connected with the fixed resistor 504 in series to change a sensitivity of an overall output. An analog voltage is fed into A/D converter 514 for display on a screen, monitor, or other user interface of a computing device, as described herein. Measuring points 508 may be used to monitor the changing voltage of each branch as the analog voltage is fed into the A/D converter 514 to determine pressure and location values of a palpation. In one particular implementation, the conversation from analog voltage to an 8-bit digital binary number takes approximately 5 ms for each of the branches. In one implementation, each of the branches is connected to a power input 510 (e.g., a 5 volt power input) and a ground connection 512.

In one particular implementation, the sensors 502 have a sensing diameter of approximate 0.5 inches, the fixed resistors 504 have a resistance of approximately 3 k ohms, and the breadboard resistors 506 have a resistance of approximately 30 k ohms. However, other sensing diameters and resistances are contemplated.

Figure 6:
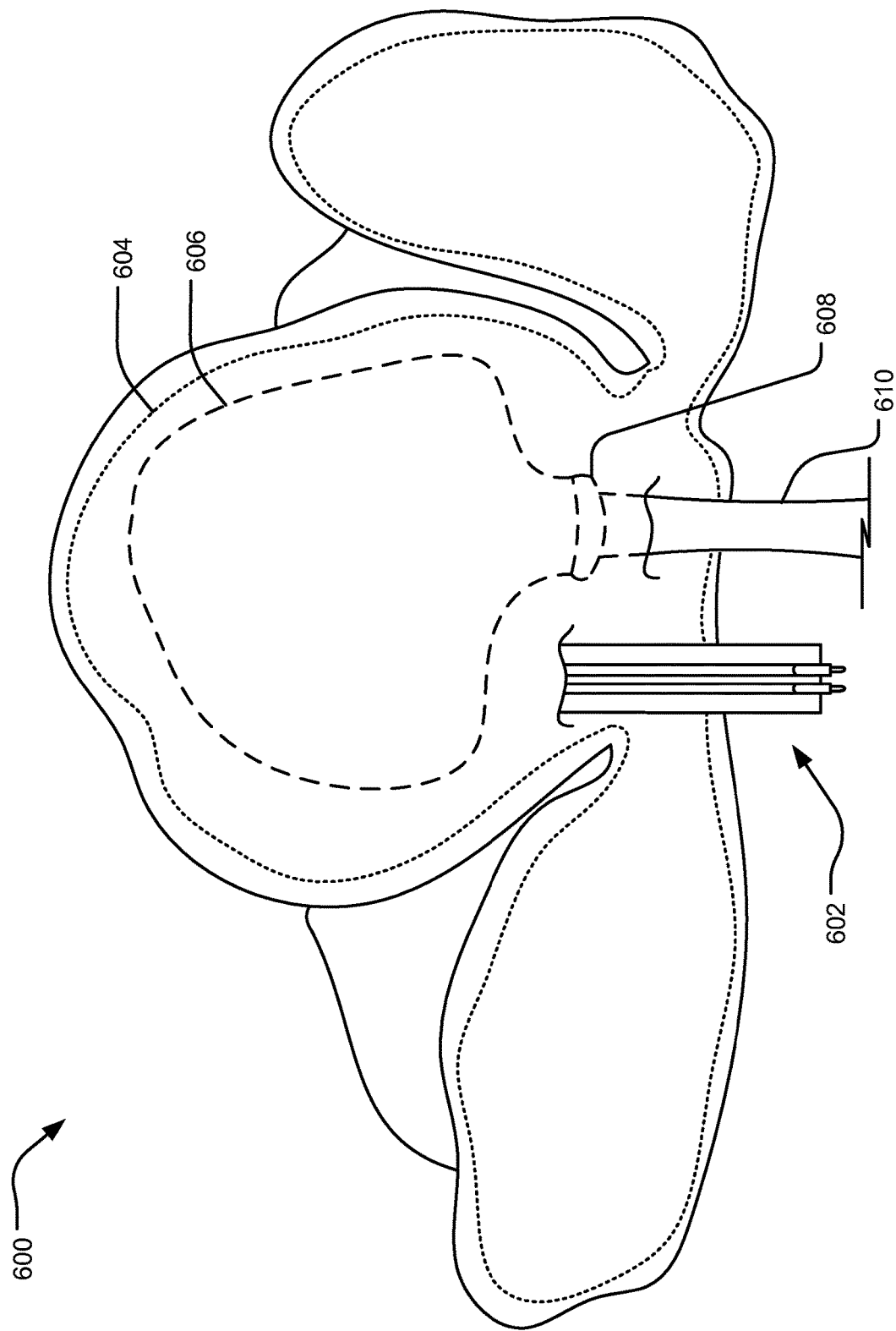
FIG. 6 illustrates an example organ model for simulated palpation.
Figure 7:
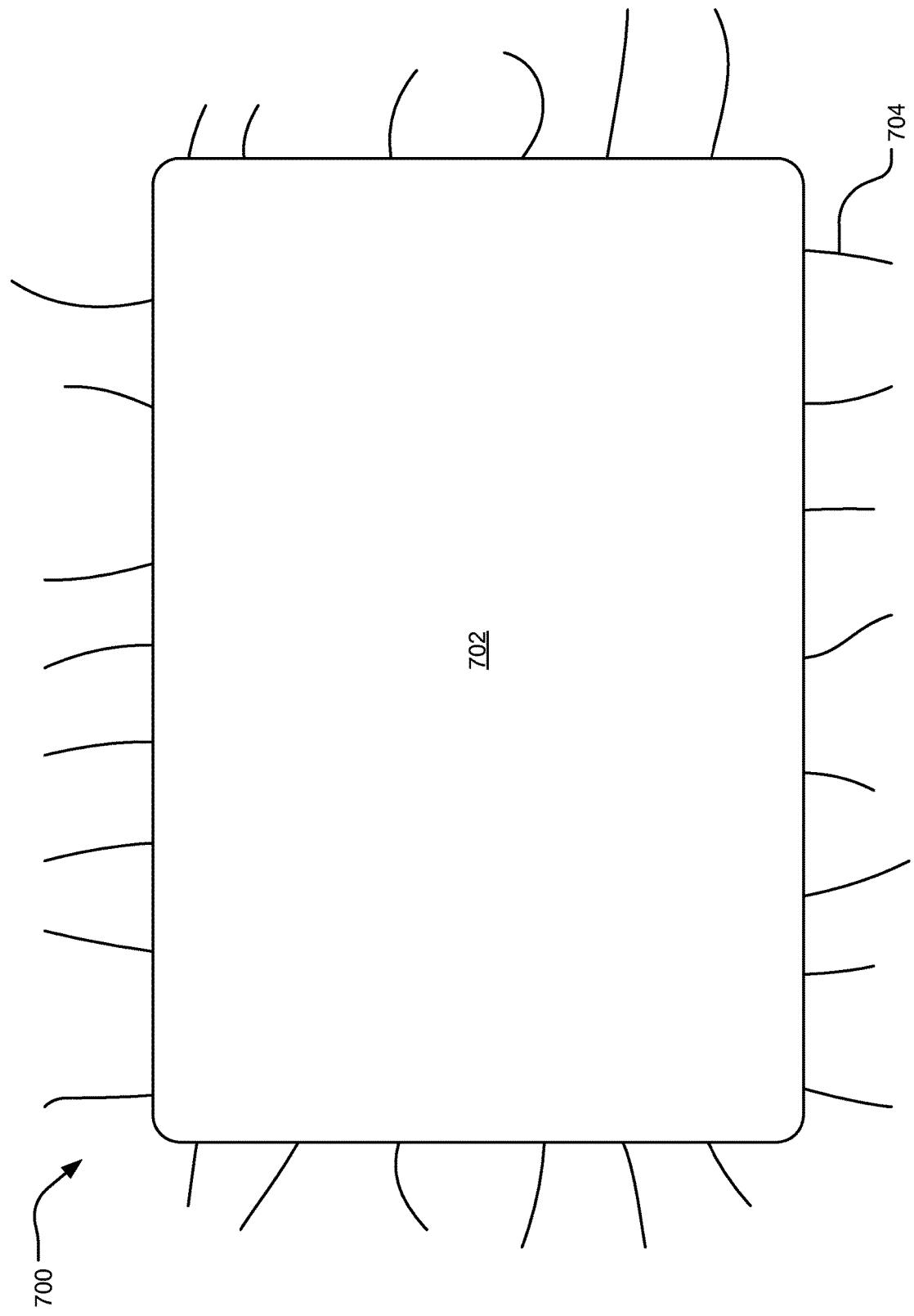
FIG. 7 shows an example skin model for simulated palpation.

For detailed descriptions of example simulated anatomical structures for an examination model, reference is made to FIGS. 6-7. FIG. 6 illustrates an example organ model 600 for simulated palpation, and FIG. 7 shows an example skin model 700 for simulated palpation.

As discussed herein, the organ model 600 is configured to replicate the textures, consistencies, colors, and other characteristics of the living specimen. The example shown in FIG. 6 is a canine liver model. However, it will be appreciated that the features of the organ model 600 may apply to other organs or anatomical structures.

In one implementation, the sensors 602 included in the organ model vary depending on the characteristics of the organ. For example, the liver, spleen, and kidneys are relatively solid organs that do not compress much during palpation, so the sensors 602 may include force sensors, such as the force sensor 400. Conversely, the bladder, intestines, and stomach are organs filled with gases or liquids that compress more when palpated, so the sensors 602 may include pressure sensors.

Furthermore, the organ model 600 includes one or more actuators, as described herein, to modify characteristics of the organ model 600 to simulate different health conditions of a living organ. In one implementation, the actuators may control one or more of a wall 604, a bladder 606, and/or the like to modify the volume, shape density, texture, and/or the other characteristics of the organ model 600 to simulate a normal condition or various abnormal conditions, including diseases, ailments, or other abnormalities. The bladder 606 may be made from various materials, including silicone or latex, and is covered by the wall 604, which may be made from a layer of silicone. It will be appreciated, however, that other materials are contemplated.

To modify the volume, density, and shape of the organ model 600, in one implementation, the bladder 606 is connected to a source of fluid, gas, or the like via a conduit 610. For example, the source may include distilled water or similar fluid. A gate 608 controls the flow of the fluid or gas into the bladder 606 to increase or decrease the volume and density of the bladder 606. In one implementation, the gate 608 is controlled using a user interface displayed with a user device to simulate different conditions. For example, an organs field 918 of a palpation simulation user interface 900 as described with respect to FIG. 9 may be used to control the gate 608, the wall 604, and/or other actuators to modify the characteristics of the organ model 600.

Depending on the anatomical structure of the organ model 600, one or more of the bladders 606 may be positioned within an interior of the organ model 600. For example, each lobe of a canine liver may include a bladder 606 to change the volume, density, and/or shape of the lobe to simulate different condition states. A liver twice the normal size may indicate a liver with fatty infiltrations, and a liver half the normal size may indicate cirrhosis. In one implementation, a thickness and a texture of the wall 604 may be similarly modified using the actuators to simulate the presence of nodules or other abnormalities.

Turning to FIG. 7, the example skin model 700 for simulated palpation is shown. In one implementation, the skin model 700 includes a simulated skin slab 702 with one or more sensors 704 embedded therein. The simulated skin slab 702 is configured to replicate the texture, consistency, color, and other characteristics of living skin. For example, the simulated skin slab 702 may be made from silicone. In one implementation, the sensors 704 include a series of wires configured for capacitive sensing, for example, as described with respect to FIGS. 3A-3B.

Figure 8:
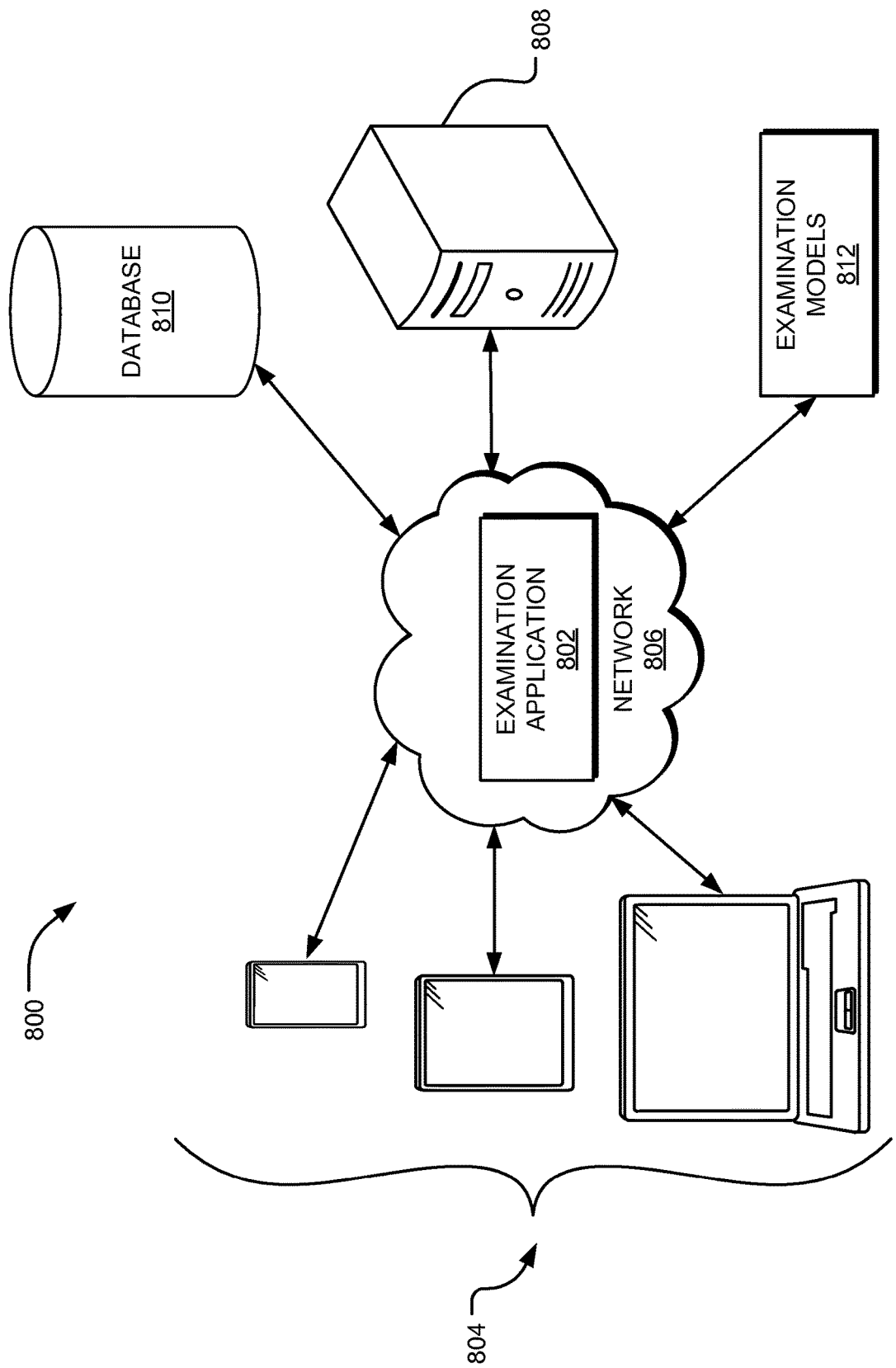
FIG. 8 illustrates an example network environment, including an examination application running on a server or other computing device coupled with a network, for simulating palpation and generating examination analytics.

FIG. 8 illustrates an example network environment 800 for simulating palpation and generating examination analytics. In the implementation, a user, such as a student or instructor, or other interested party, accesses and interacts with an examination application 802 via a network 806 (e.g., the Internet).

The network 806 is used by one or more computing or data storage devices (e.g., one or more databases 810) for implementing the examination system 100. The user may access and interact with the examination application 802 using a user device 804 communicatively connected to the network 806. The user device 804 is generally any form of computing device capable of interacting with the network 806, such as a personal computer, workstation, terminal, portable computer, mobile device, smartphone, tablet, multimedia console, and the like.

In one implementation, a server 808 hosts the examination system 100. The server 808 may also host a website or an application, such as the examination application 802 that users visit to access the examination system 100. The server 808 may be one single server, a plurality of servers with each such server being a physical server or a virtual machine, or a collection of both physical servers and virtual machines. In another implementation, a cloud hosts one or more components of the examination system 100. One or more examination models 812 (e.g., the examination model 102), the user devices 804, the server 808, and other resources, such as the database 810, connected to the network 806 may access one or more other servers for access to one or more websites, applications, web services interfaces, etc. that are used for palpation exercises, such as training and testing, and the generation of examination analytics. The server 808 may also host a search engine that the examination system 100 uses for accessing and modifying information used for the simulation of palpation procedures and the generation of examination analytics. In another implementation, the user device 804 locally runs the examination application 802, and the examination models 812 connect to the user device 804 using a wired (e.g., USB or Ethernet connection) or wireless (e.g., Bluetooth, WiFi, etc.) connection.

FIGS. 9-17 show example user interfaces generated by the examination application 802 and displayed in a browser window of the user device 804 through which access to and interactions with the examination models 812 and the captured examination data are provided. It will be appreciated by those skilled in the art that such depictions are exemplary only and not intended to be limiting.

As can be understood from FIGS. 9-17, the examination application 802 generates user interfaces providing tabs to navigate between examination calibration, training, testing, and analytics. In one implementation, selection of a calibration tab 902 facilitates the calibration and validation of system settings of the examination models 812; selection of a training tab 904 enables one or more students to perform palpation training with real time feedback; selection of a testing tab 906 facilitates accurate palpation testing; and an analytics tab 908 provides student, class, and professor analytics. It will be appreciated that more or fewer tabs may be included to navigate among examination information and other controls or information.

Figure 9:
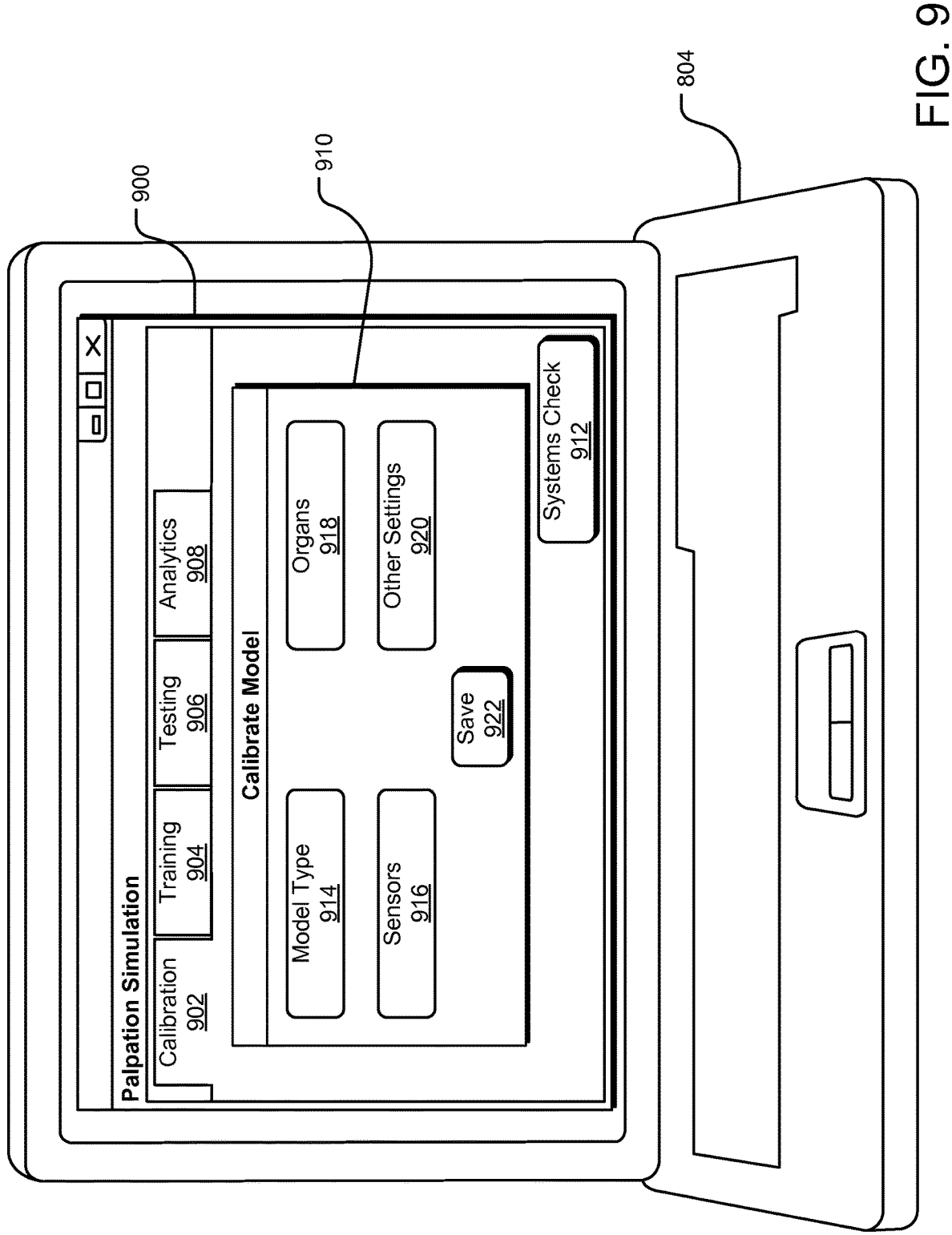
FIG. 9 shows an example palpation simulation user interface generated by the examination application and displayed in a window of a user device.

Turning first to FIG. 9, an example palpation simulation user interface 900 is shown. In one implementation, the palpation simulation user interface 900 displays a calibrate model window 910 and a systems check button 912.

The calibrate model window 910 includes one or more fields (e.g., fields 914-920) for inputting parameters of an examination model (e.g., the examination model 102) for calibration. In one implementation, the fields 914-920 include: a model type field 914 for selecting a type of the examination model (e.g., human, canine, feline, equine, bovine, or mammalian or non-mammalian species); a sensors field 916; an organs field 918; and another settings field 920 for defining other operational parameters of the examination model.

The sensors field 916 may be used for identifying the sensors (e.g., one or more of the sensors 122) included in the examination model and to define operational parameters of the sensors. For example, the sensors field 916 may specify that one or more force sensors are included in the examination model and define the proper pressure range for palpation of anatomical structures associated with the sensors. As described herein, in one particular implementation, a range of proper pressure for canine palpation ranges from approximately 2690.55 N/m$^2$ to 7046.67 N/m$^2$.

The organs field 918 may be used for setting various condition states of each of the organs and the characteristics associated with each of the condition states. The condition states may include a normal condition state and various abnormal conditions states simulating one or more diseases, ailments, and/or other abnormalities. After a condition state is entered into the organs field 918, particular characteristics (e.g., volume, density, texture, etc.) associated with that condition state are defined. The characteristics may be used to actuate the organ models included in the examination model to simulate the condition state and as a baseline for comparison to an assessment entered during training or testing.

Once all the model parameters are set using the fields 914-920, a save button 922 saves the parameters for the examination model type. Thus, when training or testing, the parameters may be loaded for the examination model by selecting the associated model type. The systems check button 912 may be used to confirm the examination model in communication with the user device 804 is operating properly based on the defined model parameters.

Figure 10:
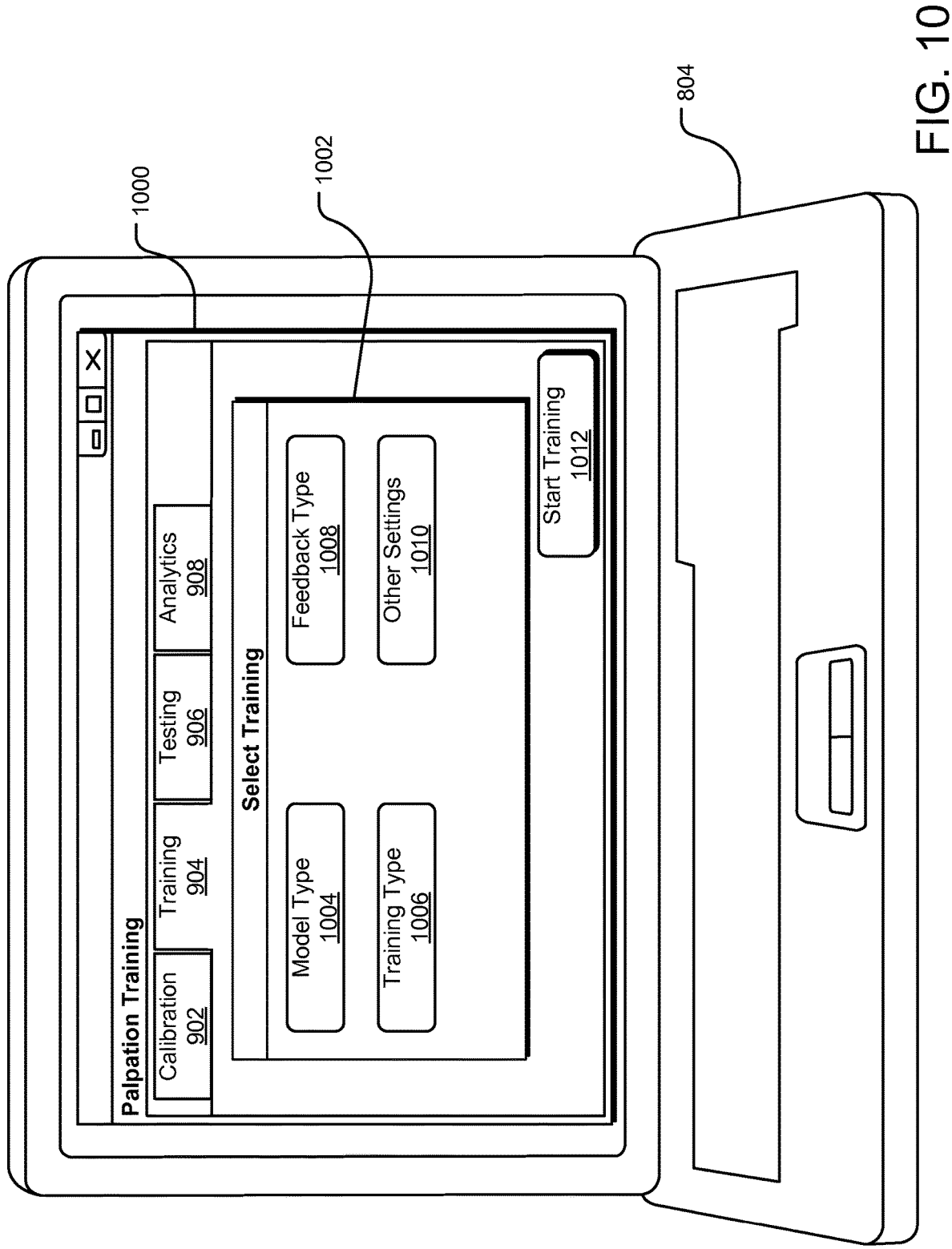
FIG. 10 illustrates an example palpation training user interface generated by the examination application and displayed in a window of a user device.

FIG. 10 illustrates an example palpation training user interface 1000. In one implementation, the palpation training user interface 1000 includes a select training window 1002 to define parameters for a training session. The parameters may be set with one or more fields 1004-1010, which may include: a model type field 1004; a training type field 1006; a feedback type field 1008; and other settings field 1010.

In one implementation, the model type field 1004 may be used for selecting a type of the examination model (e.g., human, canine, feline, equine, bovine, or mammalian or non-mammalian species) that will be used in the training. Selection of the model type may automatically load the model parameters for the model type defined using the palpation simulation user interface 900.

The training type field 1006 may be used to select a type of training exercise. For example, the training exercise may: simulate a testing session; be a timed session; and/or be training for a particular type of medical technique (e.g., abdominal palpation, prenatal palpation, CPR, emergency medicine, etc.). The feedback type field 1008 may be used to select a desired format of feedback. For example, the feedback may: have audio, visual, tactile, or multimedia format; be in real time or at the conclusion of the training session; and/or have varying levels of sensitivity to errors.

Figure 11:
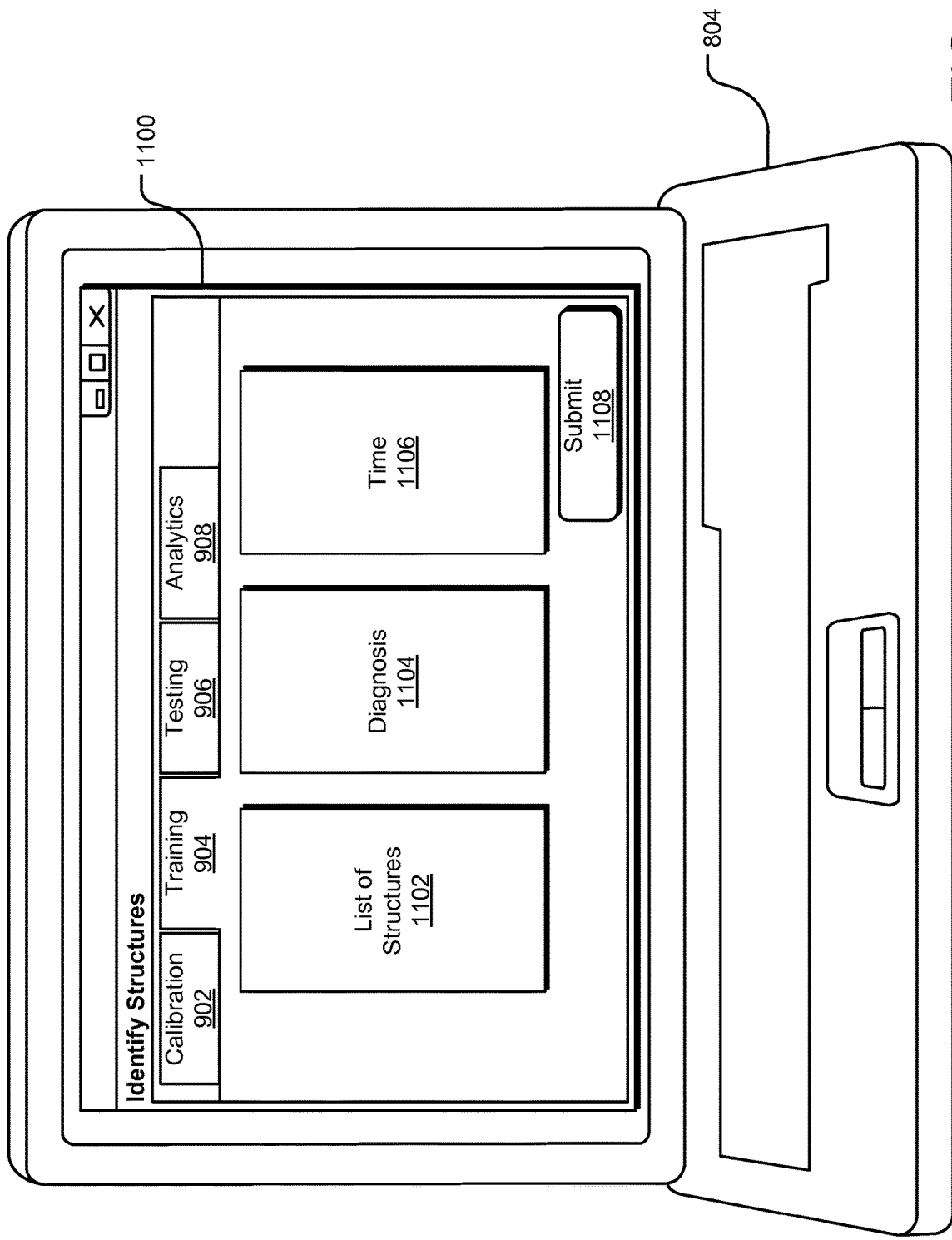
FIG. 11 depicts an example structure identification user interface generated by the examination application and displayed in a window of a user device.

Once the training is selected using the select training window 1002, a start training button 1012 may be used to initiate the training session. In one implementation, upon selection of the start training button 1012, a structure identification user interface 1100 is loaded, an example of which is shown in FIG. 11. The structure identification user interface 1100 displays a list of structures 1102 and an associated diagnosis input field 1104.

In one implementation, the list of structures 1102 includes a list of anatomical structures for the student to identify and examine during the training session with the examination model. For example, the list of structures 1102 may list an order of the six major organs examined during a palpation. The student then identifies the first organ from the list of structures 1102 and inputs an assessment of the health of the first organ into the diagnosis input field 1104. As the student performs the palpation of the first organ, a time window 1106 may display the time elapsed and/or remaining. In one implementation, a submit button 1108 may be used to generate feedback. In another implementation, the feedback is generated automatically in real time. The submit button 1108 may also be used to submit the results of the testing session. For example, a trainer may assign one or more training projects for the students to complete and track the progress and results using the examination application 802.

Figure 12:
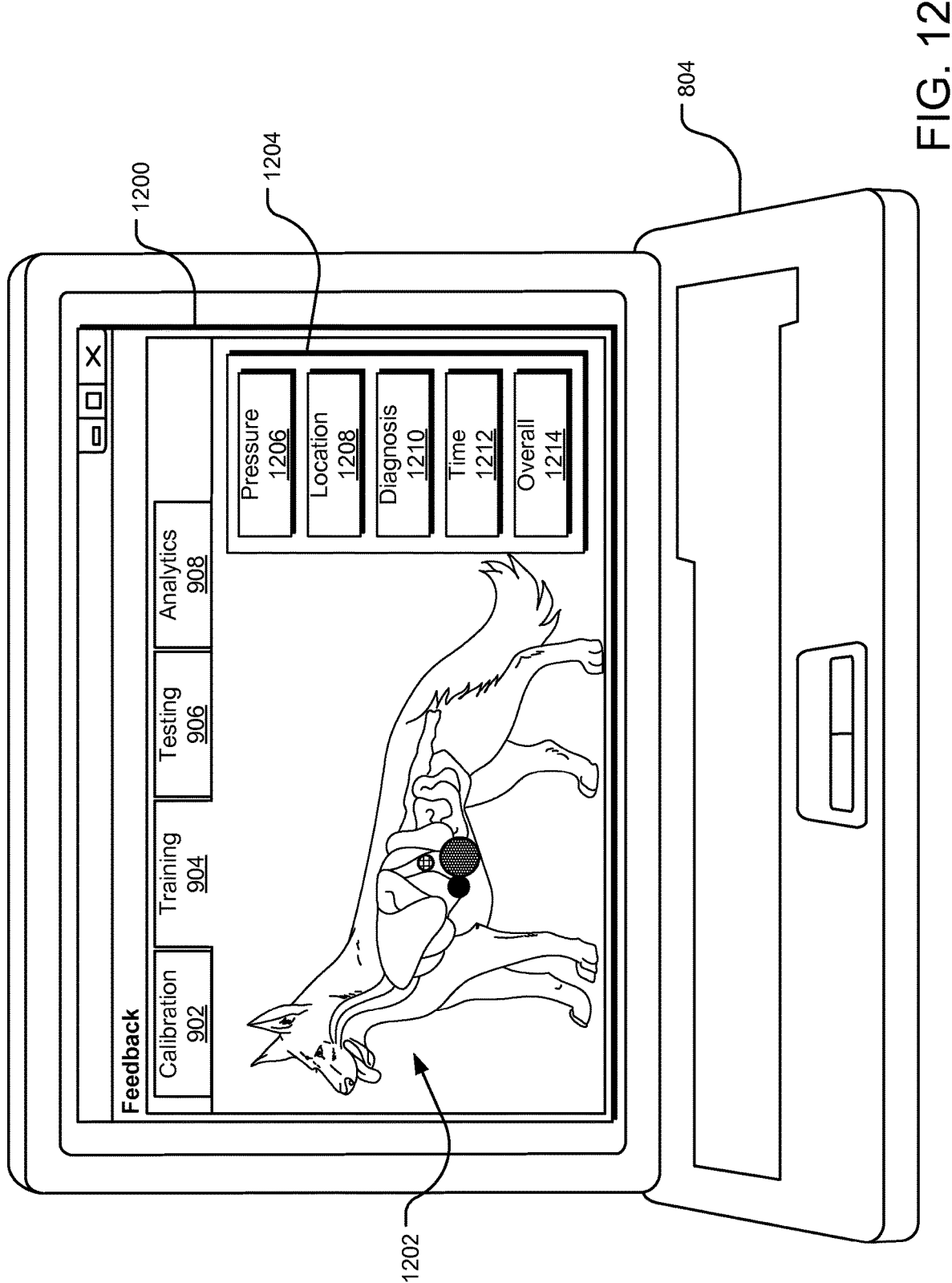
FIG. 12 shows an example feedback user interface generated by the examination application and displayed in a window of a user device.

The feedback may be presented in a feedback user interface 1200, an example of which is shown in FIG. 12. In one implementation, the feedback user interface 1200 includes visual feedback summary 1202 and/or a detailed feedback summary 1204. It will be appreciated that other feedback may also be provided, such as audio, tactile, and/or the like. In one implementation, the visual feedback summary 1202 displays a visual representation of the examination model and the anatomical structure of the examination model. A location and pressure of the palpation may be displayed on the visual representation to provide quick reference feedback. In one implementation, the location of the palpation is displayed on the visual representation 1202 as a shape, and the size, color, and/or pattern of the shape may reflect the pressure value. For example, a pressure that is too high may be represented as a larger shape and/or a first color/pattern and a pressure that is too low may be represented as a smaller shape and/or a second color/pattern.

The detailed feedback summary 1204 may include various fields 1206-1214 detailing the accuracy of the examination. As the examination is performed, the examination data captured by the sensors included in the examination model and the assessment input into the diagnosis are compared to the model parameters set for the examination model and training session.

The fields may include: a pressure field 1206 detailing the value of pressure applied during the organ palpation and whether the pressure value is within the proper pressure range; a location field 1208 specifying a location value of the organ palpation and whether the location was accurate; a diagnosis field 1210 displaying the accuracy of the health assessment input for the condition state of the organ; a time field 1212 specifying the time elapsed in performing the organ palpation; and an overall field 1214 presenting an overall score generated based on the accuracy of the fields 1206-1214.

Figure 13:
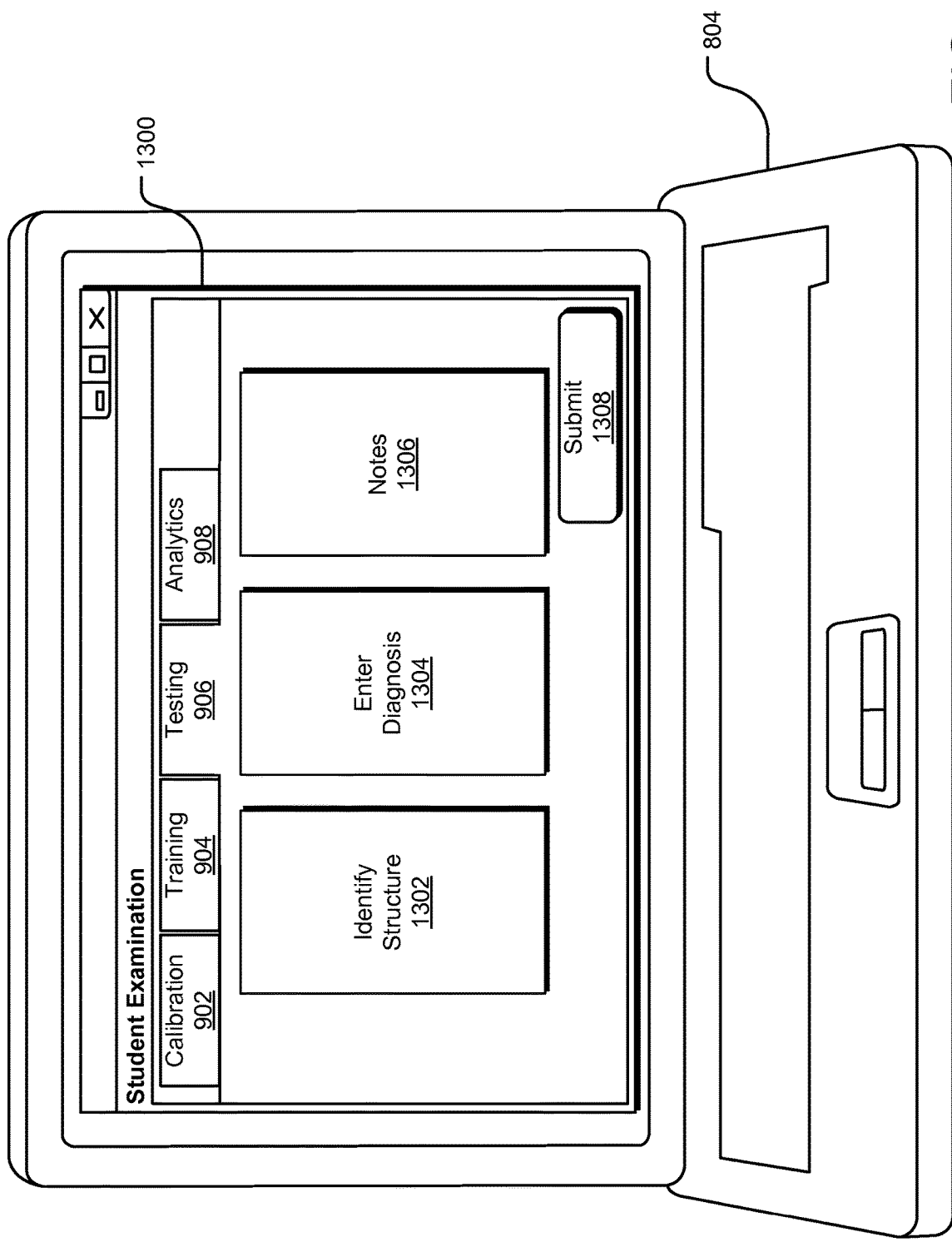
FIG. 13 illustrates an example student examination user interface generated by the examination application and displayed in a window of a user device.
Figure 14:
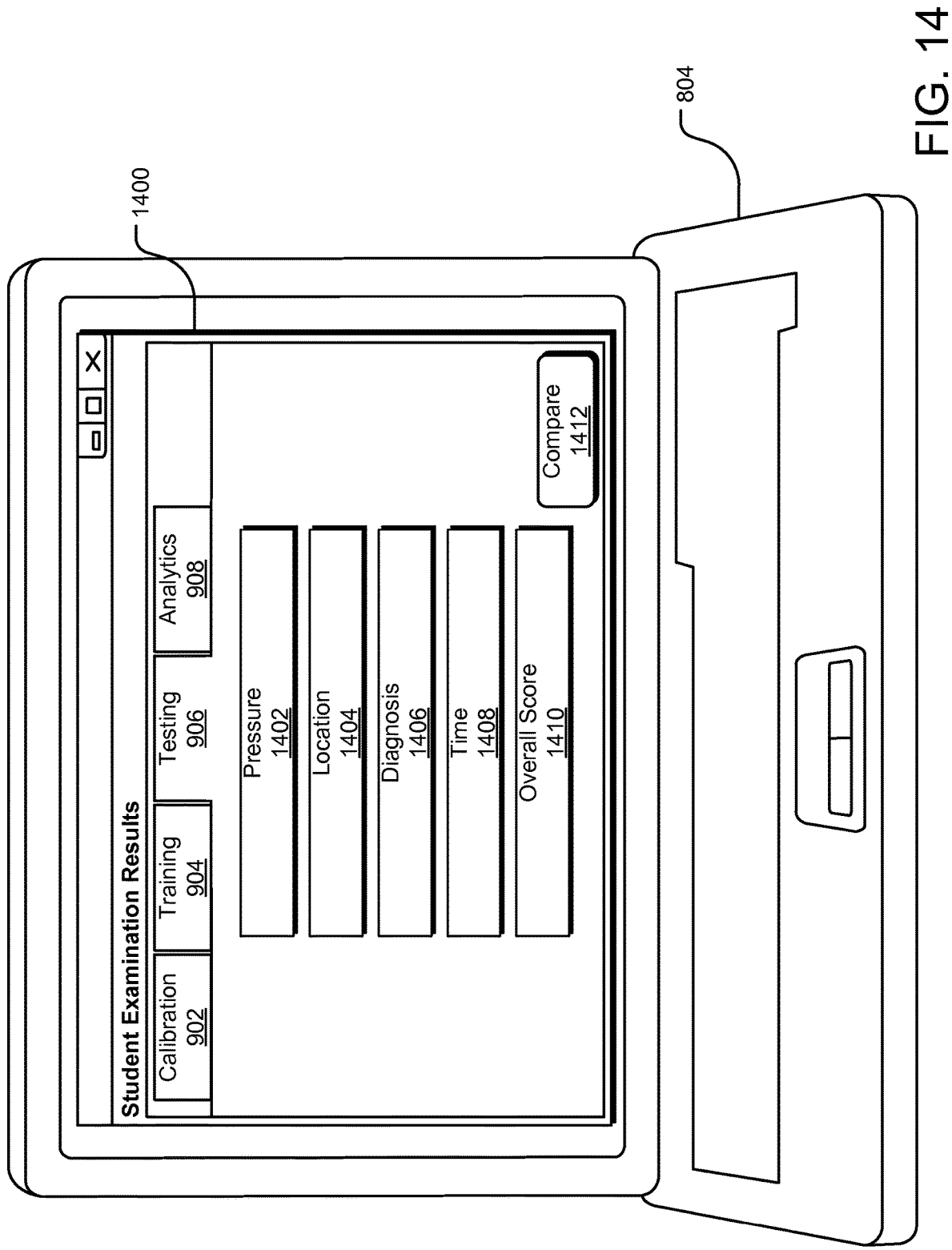
FIG. 14 shows an example student examination results user interface generated by the examination application and displayed in a window of a user device.

FIGS. 13-14 display example user interfaces for student testing. FIG. 13 illustrates an example student examination user interface 1300 and FIG. 14 shows an example student examination results user interface 1400.

In one implementation, the student examination user interface 1300 displays a list of structures 1302, a diagnosis input field 1304, and a notes field 1306. The student examination user interface 1300 may be similar to the structure identification user interface 1100 described with respect to FIG. 11.

After a testing session is initiated for a student, in one implementation, the list of structures 1302 includes a list of anatomical structures for the student to identify and examine during the testing session with an examination model. For example, the list of structures 1302 may list an order of the six major organs examined during a palpation. The student then identifies the first organ from the list of structures 1302 and inputs an assessment of the health of the first organ into the diagnosis input field 1304. The notes field 1306 may be used for the student to enter any additional notes or comments on the palpation of the first organ. The student then proceeds through the list of structures 1302 until completed. A submit button 1308 may be used to submit the test for review.

The student examination results user interface 1400 may be used for a student to access the results of one or more tests and to compare the results to the rest of the class. In one implementation, the examination application restricts access of a student (e.g., via a username and password) to only his testing results and the overall statistics of the class.

In one implementation, the student examination results user interface 1400 displays various fields detailing the accuracy of a testing session. For example, the fields may include: a pressure field 1402 detailing an accuracy of the applied pressure of each of the palpations performed; a location field 1404 specifying an accuracy of location of palpation each of the palpations performed; a diagnosis field 1406 displaying the accuracy of the health assessments input for the condition state of each of anatomical structures for each palpation performed; a time field 1408 specifying the time elapsed in performing each of the palpations; and an overall field 1410 presenting an overall score generated based on the accuracy of the fields 1402-1408. A compare button 1412 may be used to compare the testing results, including each of the fields 1402-1410 to class statistics, such as a high, a low, a median, and an average.

Figure 15:
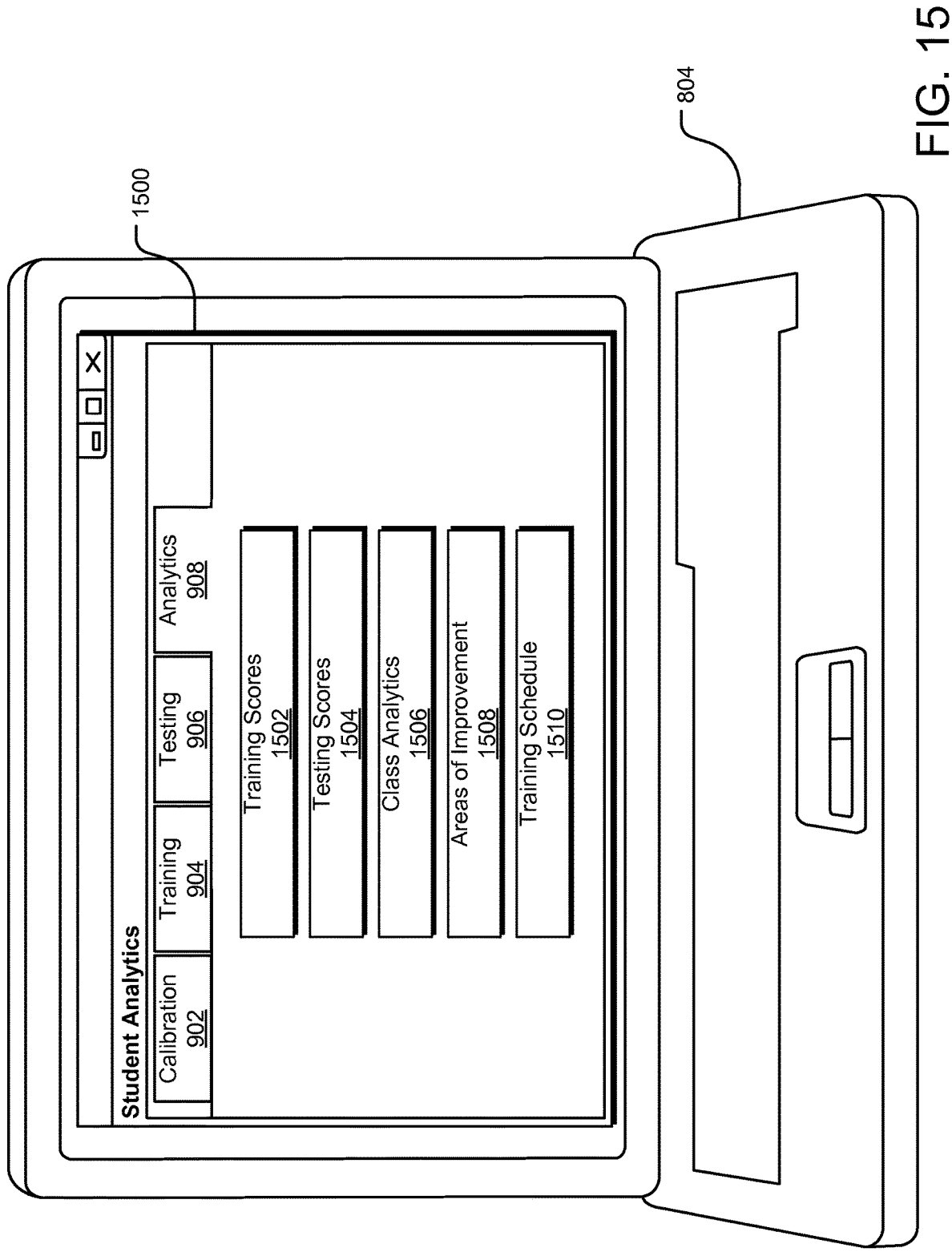
FIG. 15 illustrates an example student analytics user interface generated by the examination application and displayed in a window of a user device.
Figure 16:
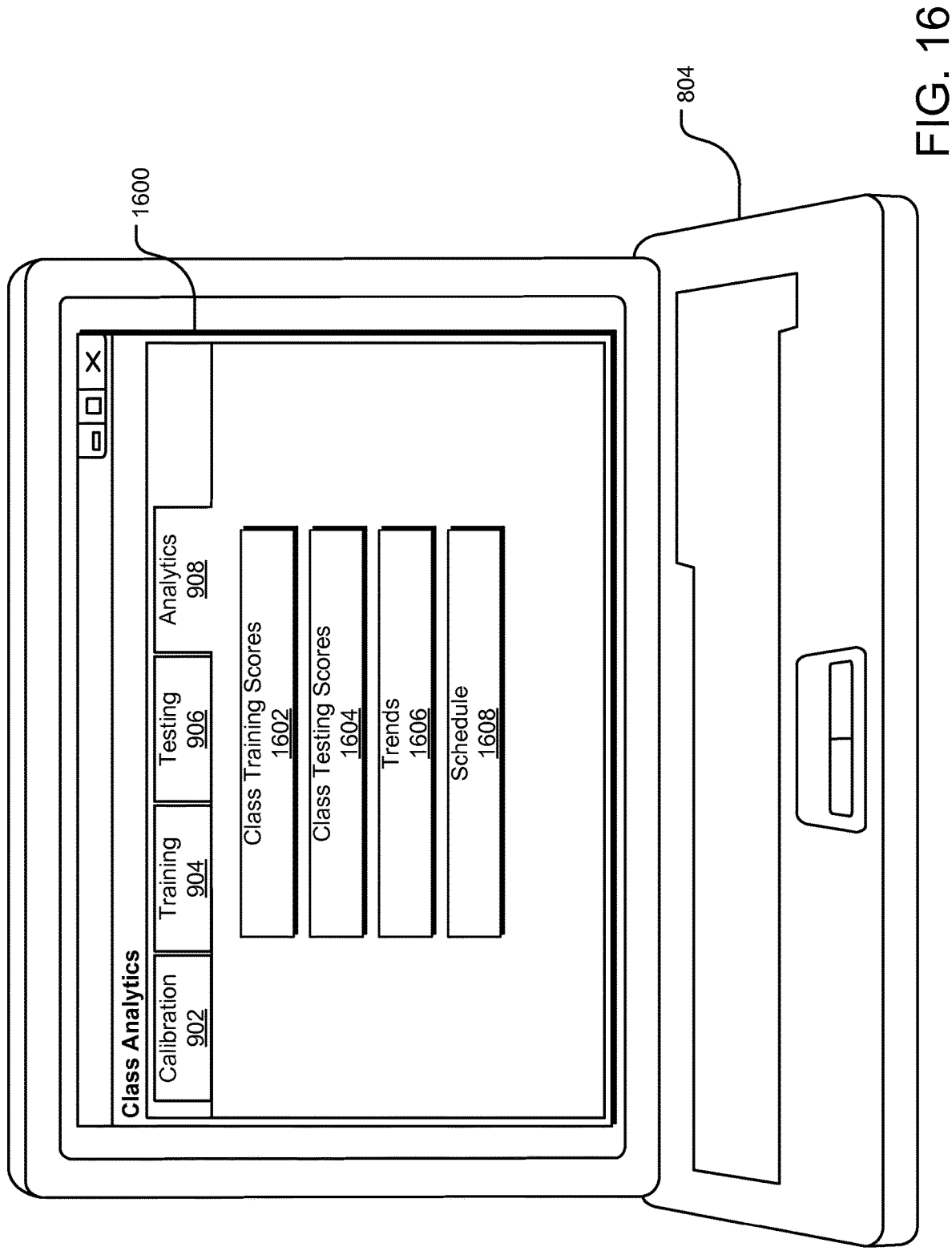
FIG. 16 depicts an example class analytics user interface generated by the examination application and displayed in a window of a user device.
Figure 17:
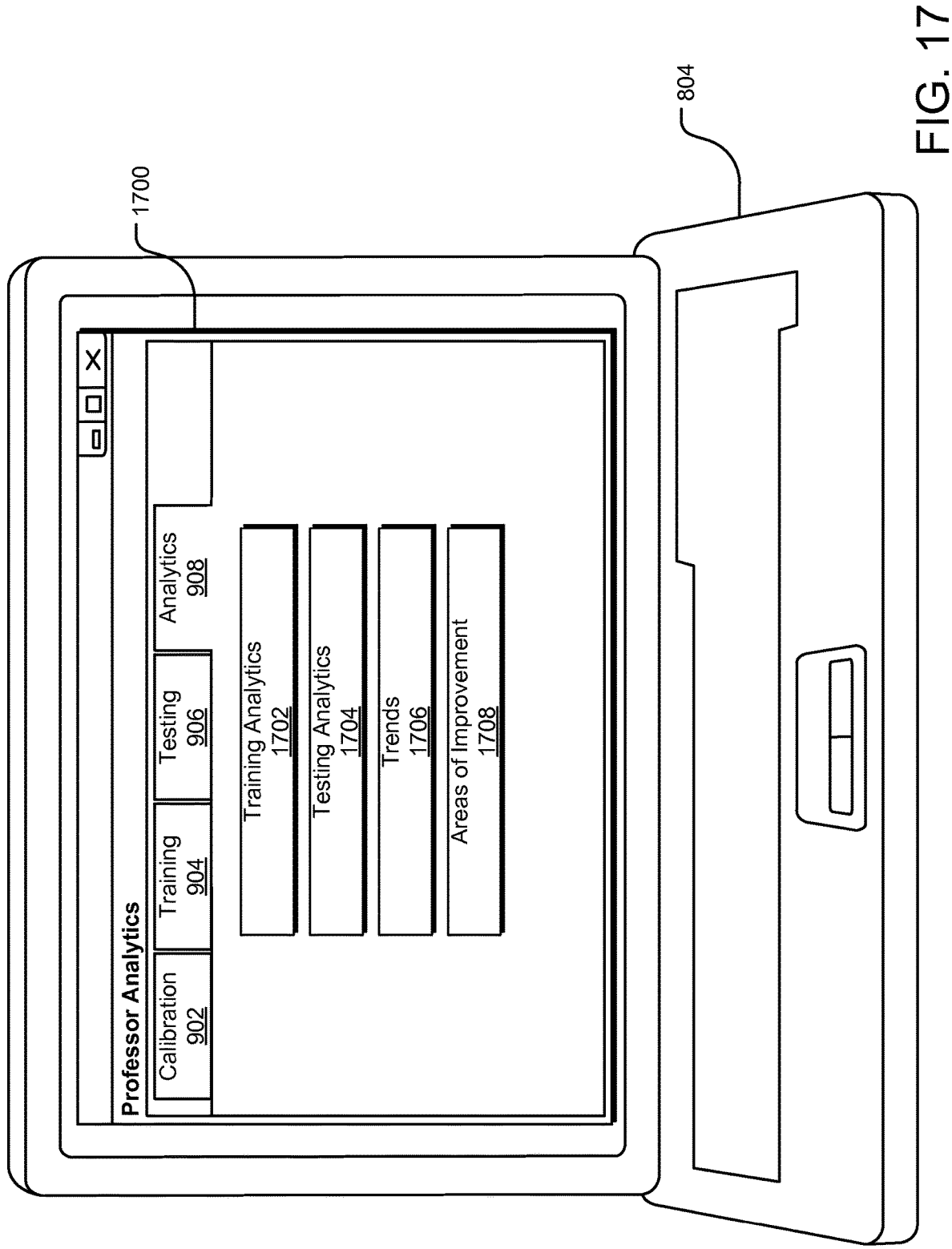
FIG. 17 shows an example professor analytics user interface generated by the examination application and displayed in a window of a user device.

FIGS. 15-17 display various example analytics user interfaces. In one implementation, the examination application restricts access of a user, for example, via a username and password to only those analytics the user is permitted to access. For example, a student may only be permitted to access his student analytics, while a trainer may be permitted to access individual student analytics, class analytics, and/or professor analytics.

FIG. 15 illustrates an example student analytics user interface 1500. In one implementation, the student analytics user interface 1500 displays: training scores 1502 detailing a score of each training session, as well as statistics of the training sessions, such as low score, high score, median score, and average score; testing scores 1504 detailing a score of each training session, as well as an overall score; class analytics 1506 specifying class statistics, such as low score, high score, median score, and average score, for comparison to the training scores 1502 and the testing scores 1504; areas of improvement 1508 specifying recurring mistakes or other suggestions for improving the examination technique based on trends in the training and/or testing sessions; and a training schedule 1510 detailing scheduled training sessions and providing an option to schedule additional training sessions.

FIG. 16 depicts an example class analytics user interface 1600. In one implementation, the class analytics user interface 1600 displays: class training scores 1602 listing each of the training scores for all the students in a class, as well as class statistics, such as low score, high score, median score, and average score; class testing scores 1604 listing each of the testing scores for all the students in a class, as well as class statistics, such as low score, high score, median score, and average score; trends 1606; and a schedule 1608 detailing upcoming training sessions and testing sessions, with an option to schedule additional sessions for the class. The trends 1606 may be used to identify common mistakes, troubleshoot, areas of higher accuracy and faster times, determine whether additional instruction is needed, and the like.

FIG. 17 shows an example professor analytics user interface 1700. In one implementation, the professor analytics user interface 1700 displays: training analytics 1702 indicating a progress of the students during training sessions; testing analytics 1704 indicating whether the students as a whole are proficient in the tested medical technique; and trends 1706, which may be used to identify common mistakes, troubleshoot, determine whether the instructor is effective in teaching certain aspects of a medical technique, and the like. Based on the trends 1708, areas of improvement 1708 may be suggested for the instructor.

Figure 18:
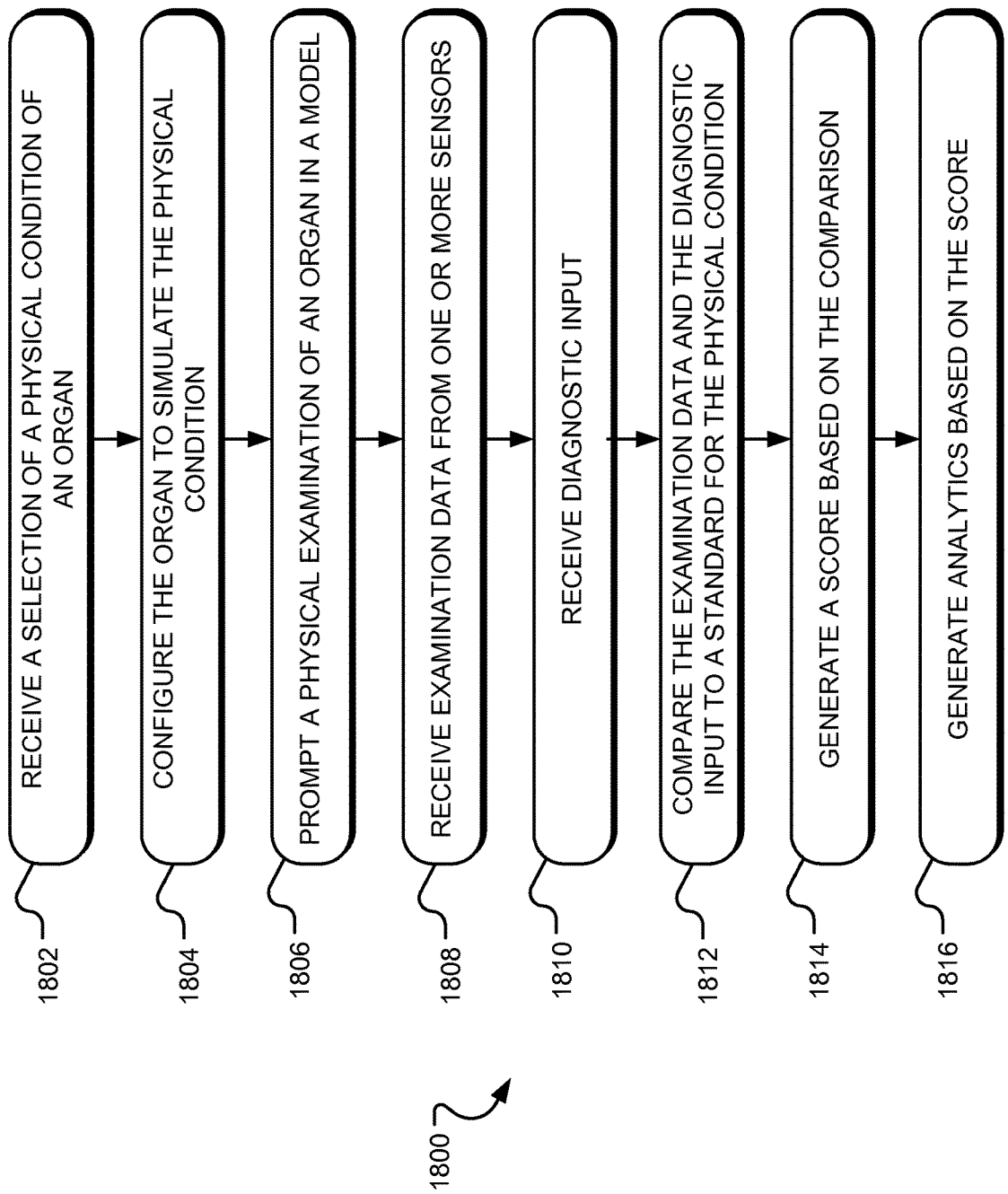
FIG. 18 illustrates example operations for palpation training.

FIG. 18 illustrates example operations 1800 for palpation training. In one implementation, an operation 1802 receives a selection of a physical condition of an organ. For example, the physical condition may specify a condition state of the organ, such as normal or a particular abnormality. An operation 1804 configures the organ to simulate the physical condition. In one implementation, the operation 1804 uses one or more actuators to modify the characteristics of the organ to replicate the characteristics of a living specimen in the condition state. The operation 1804 may modify a volume, shape, density, texture, and/or other characteristics of the organ using one or more of a wall or bladder(s).

An operation 1806 prompts a physical examination of the organ in an examination model, and an operation 1808 receives examination data from one or more sensors associated with the organ in the examination model. In one implementation, an operation 1810 receives diagnostic input specifying an assessment of the health of the organ. An operation 1812 compares the examination data and/or the diagnostics input to a standard for the physical condition of the organ, and an operation 1814 generates a score based on the comparison. For example, a sensed pressure may be compared to a pressure range, and if the sensed pressure falls within the pressure range, the score indicates that the pressure is accurate. In one implementation, an operation 1816 generates analytics, such as student, class, or professor analytics, as well as other trends, based on the score.

Figure 19:
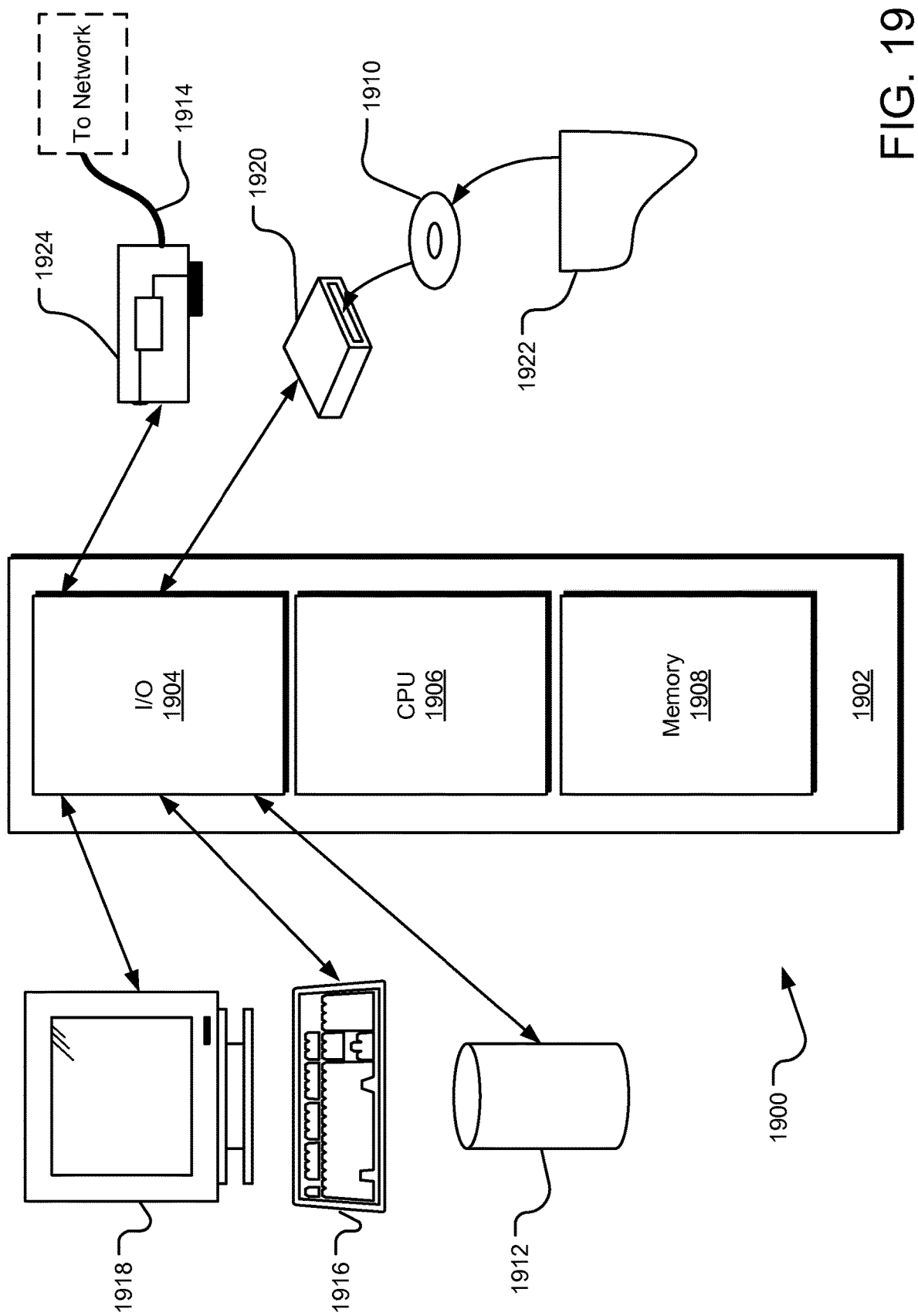
FIG. 19 is an example computing system that may implement various systems and methods discussed herein.

Referring to FIG. 19, a detailed description of an example computing system 1900 having one or more computing units that may implement various systems and methods discussed herein is provided. The computing system 1900 may be applicable to the user devices, the servers, the examination models, the controller, or other computing devices. It will be appreciated that specific implementations of these devices may be of differing possible specific computing architectures not all of which are specifically discussed herein but will be understood by those of ordinary skill in the art.

The computer system 1900 may be a general computing system is capable of executing a computer program product to execute a computer process. Data and program files may be input to the computer system 1900, which reads the files and executes the programs therein. Some of the elements of a general purpose computer system 1900 are shown in FIG. 19 wherein a processor 1902 is shown having an input/output (I/O) section 1904, a Central Processing Unit (CPU) 1906, and a memory section 1908. There may be one or more processors 1902, such that the processor 1902 of the computer system 1900 comprises a single central-processing unit 1906, or a plurality of processing units, commonly referred to as a parallel processing environment. The computer system 1900 may be a conventional computer, a distributed computer, or any other type of computer, such as one or more external computers made available via a cloud computing architecture. The presently described technology is optionally implemented in software devices loaded in memory 1908, stored on a configured DVD/CD-ROM 1910 or storage unit 1912, and/or communicated via a wired or wireless network link 1914, thereby transforming the computer system 1900 in FIG. 19 to a special purpose machine for implementing the described operations.

The I/O section 1904 is connected to one or more user-interface devices (e.g., a keyboard 1916 and a display unit 1918), a disc storage unit 1912, and a disc drive unit 1920. In the case of a tablet device, the input may be through a touch screen, voice commands, and/or Bluetooth connected keyboard, among other input mechanisms. Generally, the disc drive unit 1920 is a DVD/CD-ROM drive unit capable of reading the DVD/CD-ROM medium 1910, which typically contains programs and data 1922. Computer program products containing mechanisms to effectuate the systems and methods in accordance with the presently described technology may reside in the memory section 1904, on a disc storage unit 1912, on the DVD/CD-ROM medium 1910 of the computer system 1900, or on external storage devices made available via a cloud computing architecture with such computer program products, including one or more database management products, web server products, application server products, and/or other additional software components. Alternatively, a disc drive unit 1920 may be replaced or supplemented by an optical drive unit, a flash drive unit, magnetic drive unit, or other storage medium drive unit. Similarly, the disc drive unit 1920 may be replaced or supplemented with random access memory (RAM), magnetic memory, optical memory, and/or various other possible forms of semiconductor based memories commonly found in smart phones and tablets.

The network adapter 1924 is capable of connecting the computer system 1900 to a network via the network link 1914, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as terminals, workstations, mobile phones, tablets, laptops, personal computers, multimedia consoles, gaming consoles, set top boxes, and the like.

When used in a LAN-networking environment, the computer system 1900 is connected (by wired connection or wirelessly) to a local network through the network interface or adapter 1924, which is one type of communications device. When used in a WAN-networking environment, the computer system 1900 typically includes a modem, a network adapter, or any other type of communications device for establishing communications over the wide area network. In a networked environment, program modules depicted relative to the computer system 1900 or portions thereof, may be stored in a remote memory storage device. It is appreciated that the network connections shown are examples of communications devices for and other means of establishing a communications link between the computers may be used.

In an example implementation, examination information, data captured by the one or more sensors, instructions for operating or otherwise controlling the examination models, the examination application, a plurality of internal and external databases, source databases, and/or data cache on cloud servers are stored as the memory 1908 or other storage systems, such as the disk storage unit 1912 or the DVD/CD-ROM medium 1910, and/or other external storage devices made available and accessible via a cloud computing architecture. Examination software and other modules and services may be embodied by instructions stored on such storage systems and executed by the processor 1902.

Some or all of the operations described herein may be performed by the processor 1902. Further, local computing systems, remote data sources and/or services, and other associated logic represent firmware, hardware, and/or software configured to control operations of the examination system. Such services may be implemented using a general purpose computer and specialized software (such as a server executing service software), a special purpose computing system and specialized software (such as a mobile device or network appliance executing service software), or other computing configurations. In addition, one or more functionalities of the examination system disclosed herein may be generated by the processor 1902 and a user may interact with a Graphical User Interface (GUI) using one or more user-interface devices (e.g., the keyboard 1916, the display unit 1918, and the user devices) with some of the data in use directly coming from online sources and data stores. The system set forth in FIG. 19 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular examples. Functionality may be separated or combined in blocks differently in various implementations of the disclosure or described with different terminology. These and other variations, modifications, additions, and improvements may fall within the scope of the disclosure as defined in the claims that follow.

What is claimed is:

1. A system for simulating a medical procedure, the system comprising:
    an examination model having a plurality of anatomical structure models;
    a sensor network having a series of wires arranged in a pattern, the series of wires including a first plurality of wires extending in a first direction and a second plurality of wires spaced apart from the first plurality of wires and extending in a second direction that is different from the first direction, the pattern including an intersection of a first wire of the first plurality of wires and a second wire of the second plurality of wires, the first wire being spaced apart from the second wire by a distance at a location of the intersection, the series of wires associated with at least one of the plurality of anatomical structure models and configured to capture examination data for an examination session, the examination data captured in response to an application of a force proximate to the intersection of the first wire and the second wire during the examination session, the examination data captured based on a capacitance change of one or more of the series of wires measured in response to the application of the force decreasing the distance between the first wire and the second wire; and
    a computing device in communication with the sensor network and configured to generate feedback for an accuracy of the examination session using the examination data.

2. The system of claim 1, wherein the plurality of anatomical structure models includes one or more organ models.

3. The system of claim 1, wherein each of the anatomical structure models includes one or more actuators to modify at least one characteristic of the anatomical structure model to simulate a condition state.

4. The system of claim 3, wherein the at least one characteristic includes at least one of: volume, density, or texture.

5. The system of claim 1, wherein each of the anatomical structure models includes one or more bladders configured to receive a fluid to modify characteristics of the anatomical structure model, a flow of the fluid controlled using a pump.

6. The system of claim 5, wherein the fluid is distilled water.

7. The system of claim 1, wherein each of the anatomical structure models includes a wall configured to change at least one characteristic of an outer layer of the anatomical structure model to simulate a condition state.

8. The system of claim 7, wherein the at least one characteristic includes at least one of: texture, nodules, or surface deformations.

9. The system of claim 1, wherein the feedback is at least one of: audio, visual, tactile, or multimedia.

10. The system of claim 1, wherein the accuracy is determined based on a comparison of the examination data to a range of standard values for the medical procedure.

11. The system of claim 10, wherein the medical procedure is a palpation and the examination data includes a pressure value of the palpation and the range of standard values includes a range of pressure values.

12. The system of claim 11, wherein the accuracy is higher when the pressure value falls within the range of pressure values.

13. One or more non-transitory tangible computer-readable storage media storing computer-executable instructions for performing a computer process on a computing system, the computer process comprising:
    initiating an examination session identifying at least one target anatomical structure for examination;
    receiving examination data captured by one or more sensors positioned within the examination model, the one or more sensors associated with an anatomical structure model and including a sensor network having a series of wires arranged in a pattern, the series of wires including a first plurality of wires extending in a first direction and a second plurality of wires spaced apart from the first plurality of wires and extending in a second direction that is different from the first direction, the pattern including an intersection of a first wire of the first plurality of wires and a second wire of the second plurality of wires, the first wire being spaced apart from the second wire by a distance at a location of the intersection, the examination data captured in response to an application of a force proximate to the intersection of the first wire and the second wire during the examination session, the examination data including an examination location and at least one detected value determined based on a capacitance change measured by the one or more sensors in response to the application of the force decreasing the distance between the first wire and the second wire;

comparing the at least one detected value to a range of standard values;

comparing the examination location to the at least one target anatomical structure;

determining an accuracy of the examination session based on the comparison of the at least one detected value to the range of standard values and the comparison of the examination location to the at least one target anatomical structure, the examination session being accurate where the at least one detected value is within the range of the standard values and the examination location matches the target anatomical structure; and generating feedback for the examination session based on the accuracy of the examination session.

14. The one or more non-transitory tangible computer-readable storage media storing of claim 13, wherein the examination model is at least one of: human, canine, feline, equine, bovine, mammalian, or non-mammalian.

15. The one or more non-transitory tangible computer-readable storage media storing of claim 13, further comprising:

actuating the anatomical structure model to imitate a condition state.

16. The one or more non-transitory tangible computer-readable storage media storing of claim 15, wherein the condition state includes at least one of: normal or abnormal.

17. The one or more non-transitory tangible computer-readable storage media storing of claim 15, further comprising:

receiving an assessment of a health of the anatomical structure model; and comparing the assessment to the condition state to determine an accuracy of the assessment.

18. The one or more non-transitory tangible computer-readable storage media storing of claim 17, wherein the feedback is further generated based on the comparison of the assessment to the condition state.

* * * * *